(12) United States Patent
Hatahori et al.

(10) Patent No.: US 11,774,746 B2
(45) Date of Patent: Oct. 3, 2023

(54) INTERFERENCE IMAGE IMAGING APPARATUS

(71) Applicant: Shimadzu Corporation, Kyoto (JP)

(72) Inventors: Takahide Hatahori, Kyoto (JP); Kenji Takubo, Kyoto (JP); Koki Yoshida, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 245 days.

(21) Appl. No.: 17/604,246

(22) PCT Filed: Jan. 17, 2020

(86) PCT No.: PCT/JP2020/001604
§ 371 (c)(1),
(2) Date: Oct. 15, 2021

(87) PCT Pub. No.: WO2020/217606
PCT Pub. Date: Oct. 29, 2020

(65) Prior Publication Data
US 2022/0179196 A1    Jun. 9, 2022

(30) Foreign Application Priority Data

Apr. 26, 2019   (WO) ............... PCT/JP2019/017907

(51) Int. Cl.
| G02B 26/08 | (2006.01) |
| H04N 23/56 | (2023.01) |
| H04N 23/74 | (2023.01) |
| G02B 21/08 | (2006.01) |
| G02B 21/36 | (2006.01) |

(52) U.S. Cl.
CPC ......... *G02B 26/0875* (2013.01); *H04N 23/56* (2023.01); *H04N 23/74* (2023.01); *G02B 21/082* (2013.01); *G02B 21/361* (2013.01)

(58) Field of Classification Search
CPC ........ H04N 23/55; H04N 23/56; H04N 23/60; H04N 23/74; G02B 26/0875; G02B 21/082; G02B 21/361; G01B 9/02; G01N 21/45; G01N 21/47; G01N 21/88
See application file for complete search history.

(56) References Cited

U.S. PATENT DOCUMENTS

| 2003/0160969 A1* | 8/2003 | Endo ................. G01B 11/2441 356/520 |
| 2012/0038911 A1 | 2/2012 | Yoshihiro et al. |

(Continued)

FOREIGN PATENT DOCUMENTS

| JP | 2012-042218 A | 3/2012 |
| JP | 2017-219318 A | 12/2017 |

OTHER PUBLICATIONS

Written Opinion of the International Searching Authority dated Apr. 7, 2020 issued for International application No. PCT/JP2020/001604.

*Primary Examiner* — Kelly L Jerabek
(74) *Attorney, Agent, or Firm* — Muir Patent Law, PLLC

(57) ABSTRACT

This interference image imaging apparatus includes a first optical member (21) and a second optical member (22), and has a first portion (8) for transmitting a first bundle of rays (7) to change a direction of outgoing light with respect to incident light, and a second portion (10) for changing a phase of second bundle of rays (9) with respect to the first bundle of rays (7).

14 Claims, 15 Drawing Sheets

(56) References Cited

U.S. PATENT DOCUMENTS

| | | | |
|---|---|---|---|
| 2017/0350690 A1 | 12/2017 | Hatahori et al. | |
| 2020/0333128 A1* | 10/2020 | Akagawa | G01B 9/02091 |
| 2021/0164897 A1* | 6/2021 | Hatahori | G01N 29/2418 |
| 2021/0270777 A1* | 9/2021 | Hatahori | G01N 21/8806 |

* cited by examiner (a)

(b)

INTERFERENCE IMAGE IMAGING APPARATUS

TECHNICAL FIELD

The present invention disclosure relates to an interference image imaging apparatus.

BACKGROUND OF THE INVENTION

Conventionally, an interference image imaging apparatus is known. An interference image imaging apparatus is disclosed, for example, in Japanese Unexamined Patent Application Publication No. 2012-42218.

Japanese Unexamined Patent Application Publication No. 2012-42218 discloses a defect inspection apparatus (interference image imaging apparatus). This defect inspection apparatus is provided with a light source for emitting illumination light to an object, an optical system for interfering transmitted light of illumination light arriving from mutually different points of an object, and an imaging element for imaging an intensity pattern of the interfered transmitted light.

In the optical system of the defect inspection apparatus disclosed in Japanese Unexamined Patent Application Publication No. 2012-42218, the light arriving from an object is separated into two bundles of rays (first bundle of rays and second bundle of rays) by a half mirror. With this, the spatially separated first bundle of rays and second bundle of rays are relatively changed in phase and direction by a phase shifter and a deflector. Thereafter, the first bundle of rays and the second bundle of rays are multiplexed by a half mirror for multiplexing two bundles of rays and interfered on the imaging element, thereby producing an image. At this time, among the light reaching one point on the imaging element, the light included in the first bundle of rays and the light included in the second bundle of rays arrive from mutually different points of the object. Based on the optical interference image acquired by the imaging element, the defect is inspected.

PRIOR ART DOCUMENT

Patent Document

Patent Document 1: Japanese Unexamined Patent Application Publication No. 2012-42218

SUMMARY OF THE INVENTION

Problems to be Solved by the Invention

However, in the defect inspection apparatus (interference image imaging apparatus) of Japanese Unexamined Patent Application Publication No. 2012-42218, the light arriving from the object is separated in two directions by a half mirror. After being phase-shifted and deflected, it interferes the light separated by another half mirror. Therefore, a half mirror for separating transmitted light, a phase shift means, a deflector, and a half mirror for interfering the separated light must be provided separately. Consequently, since four optical members must be provided, the number of components increases, and the defect inspection apparatus is increased in size.

The present invention has been made to solve the aforementioned problems. It is an object of the present invention to provide an interference image imaging apparatus capable of reducing the number of components and suppressing the apparatus from becoming larger.

Means for Solving the Problem

In order to attain the above object, an interference image imaging apparatus according to one aspect of the present invention, includes:

- an irradiation unit configured to emit irradiation light from a laser light source to a measurement region of an object;
- an optical member configured to transmit the irradiation light reflected from or transmitted through mutually different points or regions of the object in a state of being separated into a first bundle of rays and a second bundle of rays and interfere the transmitted first bundle of rays and the transmitted second bundle of rays with each other;
- an imaging unit configured to image an intensity pattern of the first bundle of rays and the second bundle of rays, the first bundle of rays and the second bundle of rays being transmitted through the optical member and interfered with each other; and
- a rotation mechanism configured to rotate at least a portion of the optical member,
- wherein the optical member includes a first optical member, a second optical member arranged to face the first optical member, and a third optical member arranged to face the first optical member on a side opposite to a side where the second optical member is provided,
- wherein the rotation mechanism is configured to change a relative angle between the first bundle of rays and the second bundle of rays by rotating at least one of the first optical member and the third optical member, and
- wherein the first optical member and the second optical member are configured to transmit the second bundle of rays to change a phase of the second bundle of rays.

In the interference image imaging apparatus according to the first aspect of the present invention, as described above, the interference image imaging apparatus is provided with an optical member and a rotation mechanism. The optical member transmits the irradiation light reflected by or transmitted through mutually different points of an object in a state of being separated into a first bundle of rays and a second bundle of rays and interfere the the transmitted first bundle of rays and the transmitted second bundle of rays. The rotation mechanism rotates at least a portion of the optical member. The optical member includes a first optical member, a second optical member, and a third optical member. The rotation mechanism rotates at least one of the first optical member and the third optical member. With this, it is configured to change the relative angle between the first bundle of rays and the second bundle of rays. The first optical member and the second optical member are configured to transmit the second bundle of rays to change the phase of the second bundle of rays. Thus, there is no need to separate the irradiation light in two directions. For this reason, there is no need to provide an optical member (half mirror) for separating light and an optical member (half mirror) for interfering separated light. In addition, there is no need to provide a phase shifter by providing the first optical member and the second optical member. In addition, since the rotation mechanism is provided, there is no need to provide a deflector. Consequently, the first optical member, the second optical member, and the rotation mechanism are provided, in place of a phase shifter and a deflector. However, there is no need to provide an optical member (half mirror) for separating light and an optical member (half mirror) for interfering separated light. Therefore, it is possible to reduce the number of components and suppress the increase in the size of the apparatus.

In the interference image imaging apparatus according to the second aspect of the present invention, as described above, the interference image imaging apparatus includes:
an irradiation unit configured to emit irradiation light from a laser light source to a measurement region of an object;
an optical member configured to transmit the irradiation light reflected from or transmitted through mutually different points or regions of the object in a state of being separated into a first bundle of rays and a second bundle of rays and interfere the transmitted first bundle of rays and the transmitted second bundle of rays with each other;
an imaging unit configured to image an intensity pattern of the first bundle of rays and the second bundle of rays, the the first bundle of rays and the second bundle of rays being transmitted through the optical member and interfered with each other;
wherein the optical member includes a first optical member and a second optical member, the first optical member and the second optical member being arranged to face each other,
wherein the optical member includes a first portion and a second portion, the first portion being configured by at least one of the first optical member and the second optical member and configured to transmit the first bundle of rays to change a direction of outgoing light with respect to a direction of incident light, and the second portion being configured by the first optical member and the second optical member and configured to transmit the second bundle of rays to change a phase of the second bundle of rays with respect to the first bundle of rays.

In the interference image imaging apparatus according to the second aspect of the present invention, the interference image imaging apparatus is provided with an optical member and an imaging unit, as described above. The optical member transmits the irradiation light reflected from mutually different points or regions of an object and interferes the transmitted first bundle of rays and the transmitted second bundle of rays. The imaging unit images the intensity pattern of the interfered first bundle of rays and second bundle of rays. The optical member includes a first optical member and a second optical member arranged to face each other. The optical member is configured by at least one of the first optical member and the second optical member, and includes a first portion and a second portion. The first portion transmits the first bundle of rays to change the direction of the outgoing light with respect to the direction of the incident light. The second portion is configured by the first optical member and the second optical member, and transmits the second bundle of rays to change the phase of the second bundle of rays with respect to the first bundle of rays. This eliminates the need to provide an optical member (half mirror) for separating light and an optical member (half mirror) for interfering separated light since the irradiation light does not need to be separated in two directions. Also, by providing the first optical member and the second optical member, there is no need to provide a phase shifter and a deflector for changing the direction of the irradiation light, respectively. Consequently, the first optical member and the second optical member are provided, in place of a phase shifter and a deflector. However, there is no need to provide an optical member (half mirror) for separating light and an optical member (half mirror) for interfering the separated light. Therefore, it is possible to reduce the number of components and suppress the increase in the size of the apparatus. Further, since there is no need to provide an optical member for separating and interfering irradiation light, it is possible to suppress the loss of the light amount due to the reflection and transmission by the optical member. The optical member can interfere the irradiation light reflected from mutually different points or regions of an object. Thus, for example, by inspecting the defect based on the optical interference image obtained by interfering the irradiation light reflected from the point and the region in the surrounding range on the target, it is possible to reduce the directional dependency of the defect detection sensitivity.

In the interference image imaging apparatus according to the second aspect of the present invention, preferably, at least one of the first optical member and the second optical member includes a compound lens pair in which the first portion and the second portion are integrated. With this configuration, the compound lens in which the first portion and the second portion are integrated can be made to have both functions, a phase shift function for changing the phase of the second bundle of rays and a deflect function for changing the direction in which the first bundle of rays advances. Consequently, by only the compound lens pair, it is possible to change the direction in which the first bundle of rays advances and shift the phase of the second bundle of rays. Therefore, as compared with the case in which a half mirror, a deflection means, and a phase shift means are respectively provided, it is possible to reduce the number of components and suppress the increase in the size of the apparatus.

In the interference image imaging apparatus according to the second aspect of the present invention, preferably, the first optical member and the second optical member each are provided with the first portion on an outer side and the second portion on an inner side. With this configuration, it is possible to interfere the first bundle of rays deflected by the first portion provided on the outer side and the second bundle of rays shifted in the phase by the second portion provided on the inner side with each other at the position of the imaging unit.

In the interference image imaging apparatus according to the second aspect of the present invention, preferably, the optical member is provided with a light shielding member at a boundary portion where the first portion and the second portion are adjacent to each other. With this configuration, it is possible to suppress that the second bundle of rays transmitted through the second portion of the first optical member transmits the portion of the second optical member facing the first portion, and that the first bundle of rays transmitted through the first portion of the first optical member transmits the second portion of the second optical member. Thus, without separating the optical path of the first bundle of rays and the optical path of the second bundle of rays, it is possible to suppress the first bundle of rays and the second bundle of rays from traveling in wrong optical paths.

In the interference image imaging apparatus according to the second aspect of the present invention, preferably, the optical member is arranged close to a position of a limiting aperture of an optical system for causing the irradiation light reflected from the object to be incident on the imaging unit. Here, the position of the limiting aperture position of the optical system denotes a position where the irradiation light reflected at respective positions within the measurement region of the object and incident on the imaging unit passes generally the same region. Further note that, the "close to" means the case in which it is in contact with the limiting aperture and the case in which it is detached from the limiting aperture. By configuring as described above, the irradiation light reflected at each position in the measurement region and incident on the imaging unit transmits through the region in approximately the same optical member. Therefore, the ratio of the amount of light transmitted through the first portion of the optical member to the amount of light transmitted through the second portion does not differ greatly depending on the position in the measurement region. In addition, even in a case where the first portion has a function that causes deflection that differs depending on the position to be transmitted, the characteristic of the deflection does not change greatly depending on the position in the measurement region.

In the interference image imaging apparatus according to the second aspect of the present invention, preferably, the optical member is configured such that the first portion formed in an annular shape when viewed in an incident direction of the irradiation light is arranged adjacently so as to surround the second portion formed in a circular shape. With this configuration, the first portion for changing the direction in which the first bundle of rays advances and the second portion for shifting the phase of the second bundle of rays are adjacent. Therefore, it is possible to reduce the space as compared with the conventional one in which a phase shift means for shifting the phase and a deflection means for changing the direction in which the irradiation light advances are separately provided. This also makes it possible to suppress the increase in the size of the apparatus.

In the interference image imaging apparatus according to the second aspect of the present invention, preferably, a surface of the first portion of the first optical member facing the second optical member and opposing surfaces of the second portion of the first optical member and the second portion of the second optical member are provided so as to be inclined with respect to a direction perpendicular to an incident direction of the irradiation light, and the opposing surfaces of the second portion of the first optical member and the second portion of the second optical member are provided approximately in parallel to each other. With this configuration, the light transmitted through the first portion is refracted at the first portion of the first optical member and then transmitted through the second optical member, so that the traveling direction of the first bundle of rays can be changed. On the other hand, even if the light transmitted through the second portion is refracted by the slope of the second portion of the first optical member, since the second portion of the second optical member is inclined in the same way as in the second portion of the first optical member, the second bundle of rays is further refracted when transmitting through the second optical member and returns in the original direction. For this reason, it is possible to transmit the second bundle of rays without changing the direction in which it travels. Further, in this configuration, by moving the second optical member in a direction perpendicular to the traveling direction of the second bundle of rays, it is possible to easily increase the optical length of the second bundle of rays that transmits the second portion than the optical path length of the first bundle of rays that transmits through the first portion. Consequently, by the difference of the optical path lengths, it is possible to easily shift the phase difference between the first bundle of rays that transmits through the first portion and are incident on the imaging unit and the second bundle of rays that transmits through the second portion and is incident on the imaging unit.

In the interference image imaging apparatus according to the second aspect of the present invention, preferably, the first optical member is configured such that the second portion is formed in a circular shape when viewed in an incident direction of the irradiation light and the first portion is formed in a cone shape from which a head portion is removed, and a tip end of the first portion being in contact with the the second portion. With this configuration, the first bundle of rays which is deflected in an annular shape around the second bundle of rays can be incident on the imaging unit.

In the interference image imaging apparatus according to the second aspect of the present invention, preferably, the first optical member is configured such that the first portion is formed in a polygonal pyramid from which a head portion is removed as viewed in an incident direction of the irradiation light. With this configuration, the first bundle of rays deflected around the second bundle of rays can be incident.

In the interference image imaging apparatus according to the second aspect of the present invention, preferably,
  the optical member includes a third optical member arranged to face the first optical member,
  a surface of the second portion of the first optical member facing the second optical member and a surface of the second portion of the second optical member facing the first optical member are inclined in a first direction perpendicular to an incident direction of the irradiation light,
  a surface of the second portion of the first optical member facing the third optical member and a surface of the second portion of the third optical member facing the first optical member are inclined in a second direction perpendicular to the incident direction of the irradiation light and intersecting with the incident direction of the irradiation light, and
  the optical member further includes a rotation mechanism for changing a relative angle between the first direction and the second direction by rotating the third optical member.

With this configuration, by changing the relative angle between the first direction and the second direction by rotating the third optical member by the rotation mechanism, since it is possible to change the angle with respect to the illumination direction of the surface of the optical member where the second bundle of rays is incident or emits, it is possible to change the angle of the refraction of the second bundle of rays. Therefore, since it is possible to adjust the position where the second bundle of rays is incident on the imaging unit, it is possible to adjust the relative position between the position at which the first bundle of rays is incident on the imaging unit and the position at which the second bundle of rays is incident on the imaging unit. As a result, even when there is a manufacturing error in the optical member, it is possible to suppress the occurrence of the individual difference of an interference image imaging apparatus by adjusting the relative position between the first bundle of rays and the second bundle of rays.

In this case, preferably, the rotation mechanism includes a first rotation mechanism for integrally rotating the first optical member and the third optical member with respect to the second optical member. With this configuration, the first optical member and the third optical member are integrally rotated. Therefore, it is possible to change the relative position between the second optical member and the first optical member without changing the relative position between the first optical member and the third optical member. With this, it is possible to adjust the refraction angle of the second bundle of rays in the first direction without changing the refraction angle of the second bundle of rays in the second direction.

In the interference image imaging apparatus provided with the above-described first rotation mechanism, preferably, the rotation mechanism includes a first rotation mechanism for integrally rotating the first optical member and the third optical member with respect to the second optical member. With this configuration, it is possible to change the relative position between the second optical member and the first optical member by the first rotation mechanism and also change the relative position between the first optical member and the third optical member by the second rotation mechanism. Thus, in addition to the refraction angle of the second bundle of rays in the first direction, the refraction angle in the second direction can be adjusted.

In the interference image imaging apparatus including the third optical member, preferably, the second optical member, the first optical member, and the third optical member are arranged in this order in the incident direction of the irradiation light. With this configuration, it is possible to change the direction of the irradiation light whose phase has been changed by the second optical member and the first optical member. Therefore, it is possible to adjust the relative position between the irradiation light changed in the phase and the irradiation light deflected by the second optical member or the first optical member.

Effects of the Invention

As described above, according to the present invention, it is possible to provide an interference image imaging apparatus capable of reducing the number of components and suppressing the increase in the size of the apparatus.

EMBODIMENTS FOR CARRYING OUT THE INVENTION

Hereinafter, some embodiments in which the present invention has been embodied will be described with reference to the attached drawings.

(Configuration of Displacement Measurement Apparatus)

Referring to FIGS. 1 to 5, the configuration of the displacement measurement device 100 according to a first embodiment will be described. In this embodiment, a case in which the displacement measurement device 100 is used for a defect inspection. Note that the displacement measurement device 100 is an example of the "interference image imaging apparatus" recited in claims.

Figure 1:
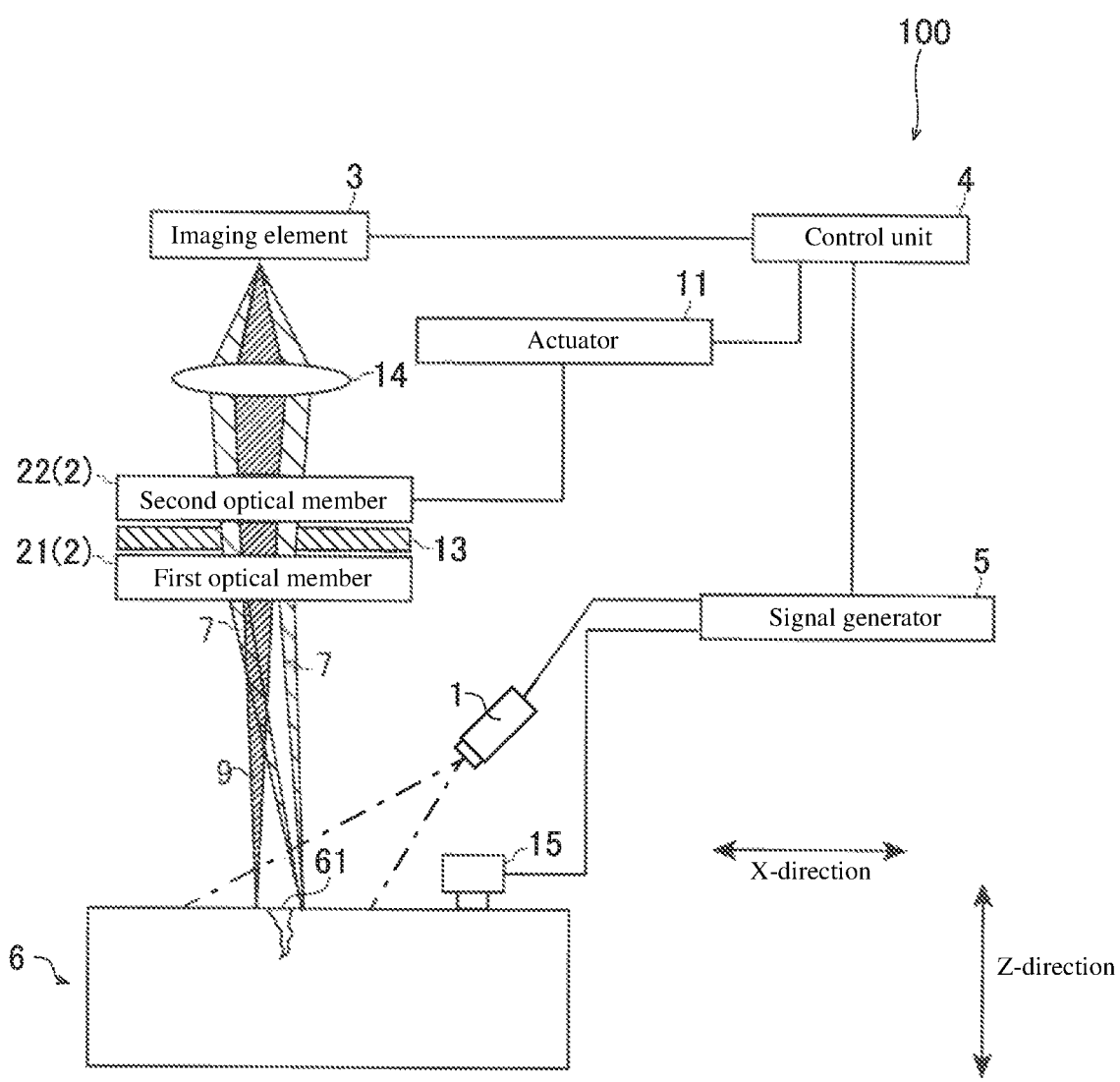
FIG. 1 is a block diagram showing a configuration of an interference image imaging apparatus according to first to third embodiments.

As shown in FIG. 1, the displacement measurement device 100 according to the first embodiment includes an irradiation unit 1, an optical member 2, and an imaging element 3. Note that the imaging element 3 is an example of the "imaging unit" recited in claims. Further note that the displacement measurement device 100 is provided with a control unit 4.

The irradiation unit 1 is connected to a signal generator 5 via a cable. The irradiation unit 1 emits irradiation light to a measurement region 61 of an object 6. The irradiation unit 1 includes a laser light source and an illumination light lens (not shown). The illumination light lens radiates the irradiation light emitted from the laser light source to the entire measurement region 61 on the surface of the object 6. The first bundle of rays 7 and the second bundle of rays 9 are irradiation light reflected from mutually different points or regions of the object 6. The first bundle of rays 7 and the second bundle of rays 9 refer to the bundle of rays spatially separated by a first portion 8 of an optical member 2 and the bundle of rays spatially separated by a second portion 10 of the optical member 2, respectively. In FIG. 1, the first bundle of rays 7 and the second bundle of rays 9 are indicated by different hatchings.

Figure 2:
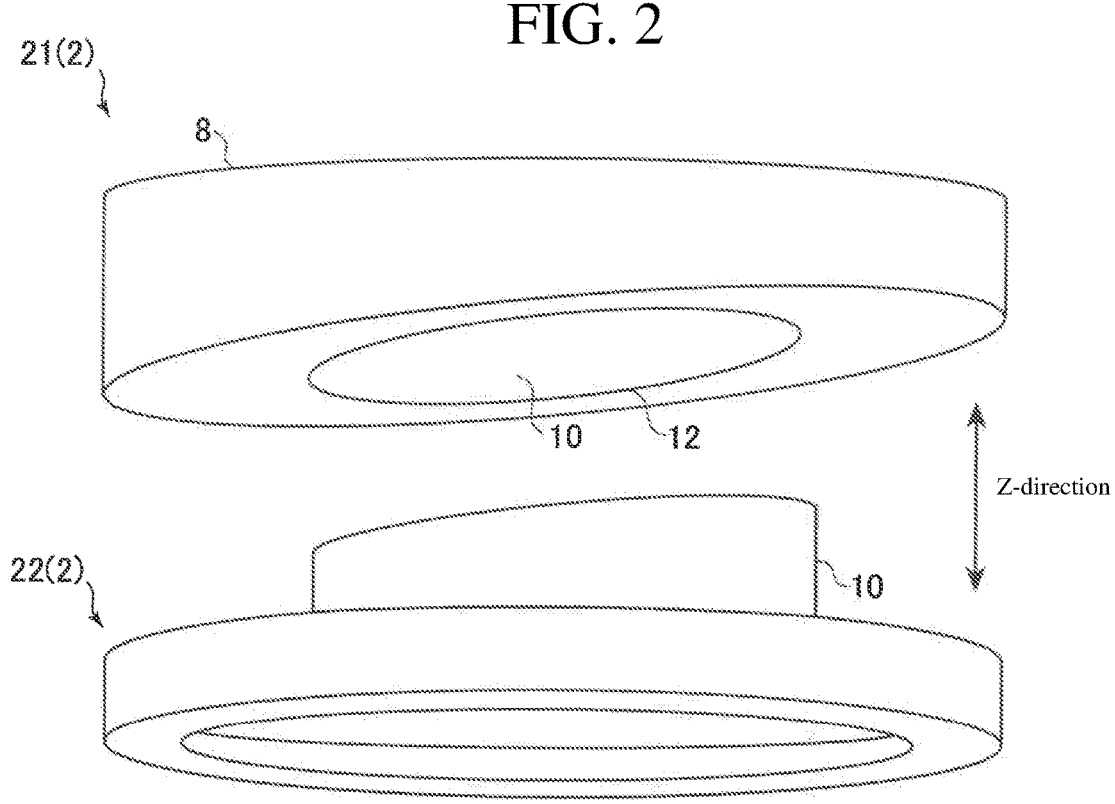
FIG. 2 is a diagram showing an example of a first optical member and a second optical member according to the first embodiment.

As shown in FIG. 2, the optical member 2 includes a first optical member 21 and a second optical member 22, which are arranged so as to face each other. The first optical member 21 includes a compound lens pair in which the first portion 8 and the second portion 10 are integrated. The optical member 2 is configured by at least one of the first optical member 21 and the second optical member 22. The optical member 2 has a first portion 8 and a second portion 10. The first portion 8 transmits the first bundle of rays 7 to change the direction of the outgoing light with respect to the direction of the incident light. The second portion 10 is configured by the first optical member 21 and the second optical member 22, and transmits the second bundle of rays 9 to change the phase of the second bundle of rays 9 with respect to the first bundle of rays 7.

In the first embodiment, the first portion 8 is provided on the outer side and the second portion 10 is provided on the inner side. Further, the first portion 8 formed in an annular shape when viewed in the incident direction of the irradiation light is arranged adjacently so as to surround the second portion 10 formed in a circular shape.

In the first embodiment, the thickness of the second portion 10 in the first optical member 21 and the second optical member 22 has a convex shape larger than that of the first portion 8.

The surface of the first portion 8 of the first optical member 21 facing the second optical member 22 is provided so as to be inclined with respect to a direction (X-direction) perpendicular to the incident direction of the irradiation light. Therefore, the irradiation light (first bundle of rays 7) transmitted through the first optical member 21 is refracted at the boundary between the first optical member 21 and air, and travels toward the second optical member 22. Then, the irradiation light is further refracted at the boundary between the second optical member 22 and air, transmitted through the second optical member 22, and reaches the imaging element 3. With this, it is possible to irradiate the first bundle of rays 7 in which the irradiation light has been deflected.

The opposing surfaces of the second portion 10 of the first optical member 21 and the second portion 10 of the second optical member 22 are arranged so as to be inclined with respect to a direction (X-direction) perpendicular to the incident direction of the irradiation light. Further, the second portion 10 of the first optical member 21 and the second portion 10 of the second optical member 22 are arranged substantially in parallel to each other. Therefore, the irradiation light (second bundle of rays 9) is transmitted through the second portion 10 of the first optical member 21 and is refracted at the boundary between the first optical member 21 and air. Then, the irradiation light is refracted to the opposite side at the boundary between the second optical member 22 and air, and returns in the same direction as when incident on the second portion 10 of the first optical member 21. That is, as a result, the irradiation light has traveled straight through the first optical member 21 and the second optical member 22. The second bundle of rays 9 having passed through the second portion 10 reaches the imaging element 3.

The opposing surfaces of the second portion 10 of the first optical member 21 and the second portion 10 of the second optical member 22 are arranged so as to be inclined with respect to a direction (X-direction) perpendicular to the incident direction of the irradiation light. Therefore, by moving the second optical member 22 in a direction perpendicular to the traveling direction of the second bundle of rays 9, the optical path length of the second bundle of rays 9 transmitted through the second portion 10 can be easily increased to be larger than the optical path length of the first bundle of rays 7 transmitted through the first portion 8. By the difference in the optical path length, it is possible to easily shift the phase difference between the first bundle of rays 7 transmitted through the first portion 8 and incident on the imaging element 3 and the second bundle of rays 9 transmitted through the second portion 10 and incident on the imaging element 3.

Figure 4:
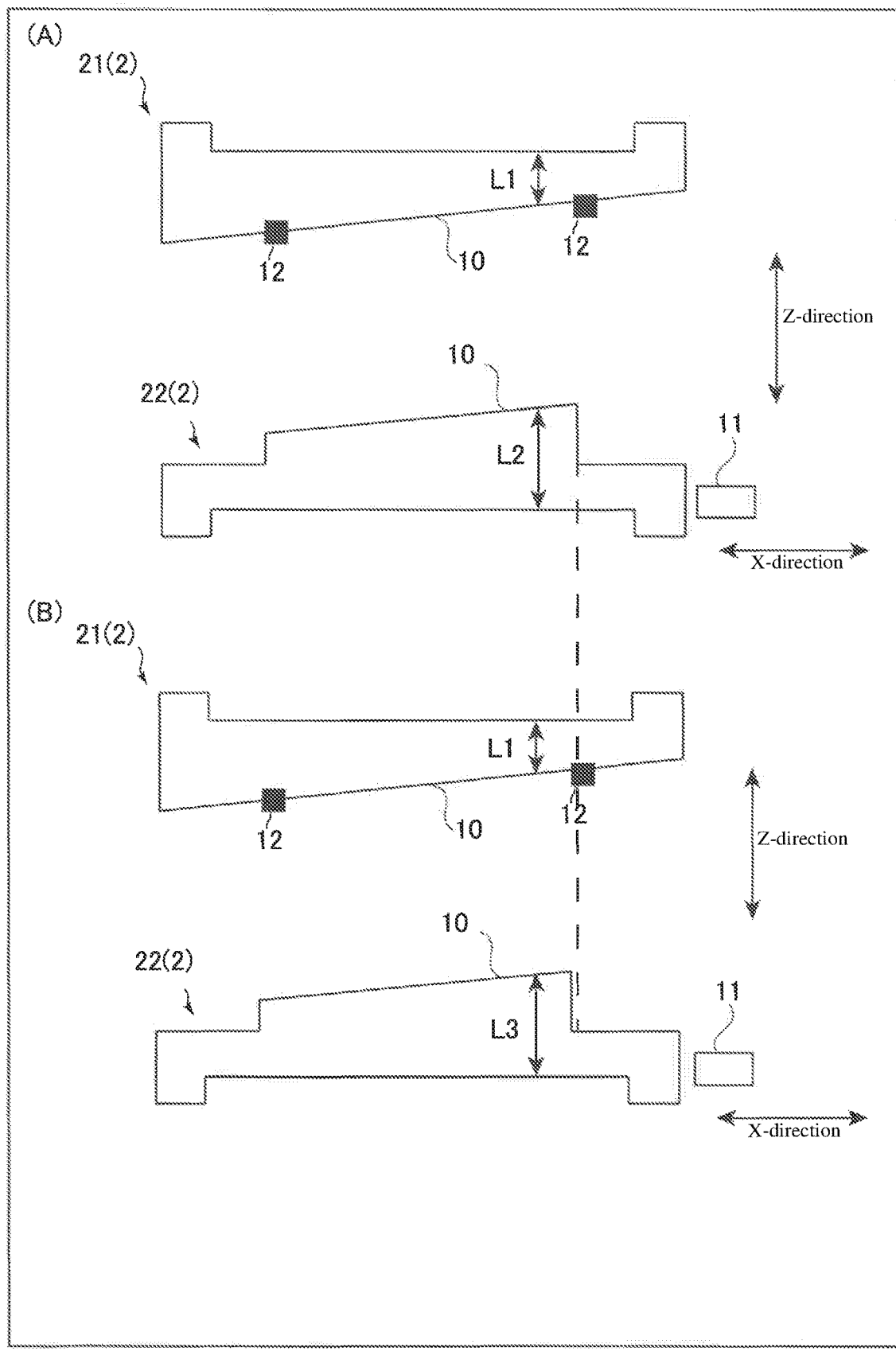
FIG. 4 is a diagram showing the movement of the second optical member according to the first embodiment. (A) of FIG. 4 is a diagram showing the position of the first optical member and that of the second optical member before the movement. (B) of FIG. 4 is a diagram showing the position of the first optical member and that of the second optical member after the movement.

As shown in FIG. 4, the second optical member 22 is moved by the actuator 11 in a direction (X-direction) intersecting the direction (Z-direction) in which the light travels. Therefore, the sum of the thicknesses of the second portion 10 of the first optical member 21 and the thickness of the second portion 10 of the second optical member 22 changes. Specifically, prior to the movement shown in (A) of FIG. 4, the thickness which is a length in a Z-directional at a certain opposed part of the second portion 10 of the first optical member 21 and the second portion 10 of the second optical member 22 is a sum length of L1 and L2. On the other hand, after the movement shown in (B) in FIG. 4, the thickness which is a length in the Z-direction at a certain part of the second portion 10 of the first optical member 21 and the second portion 10 of the second optical member 22 is a sum length of L1 and L3. Since the optical path length is changed by changing the thickness as described above, it is possible to change the shift amount of the phase of the second bundle of rays 9.

The optical member 2 is configured to interfere the first bundle of rays 7 and the second bundle of rays 9 reflected at mutually different positions of the object 6. The first bundle of rays 7 and the second bundle of rays 9 are incident on the first optical member 21 substantially in parallel to each other. By deflecting the first bundle of rays 7 at the first portion 8, the first bundle of rays 7 and the second bundle of rays 9 reach at the same location of the imaging element 3, so the first bundle of rays 7 and the second bundle of rays 9 interfere.

A light shielding member 12 is provided at the boundary where the first portion 8 and the second portion 10 of the first optical member 21 are adjacent. The light shielding member 12 has an annular shape. The light shielding member 12 can suppress the first bundle of rays 7 reflected from the object 6 from traveling to the second portion 10 of the second optical member 22. Further, the light shielding member 12 can suppress the second bundle of rays 9 from traveling to the portion of the second optical member 22 facing the first portion 8 of the first optical member 21.

As shown in FIG. 1, the optical member 2 is arranged at a position close to the limiting aperture 13. Therefore, the light reflected at mutually different positions of the measurement region 61 of the object 6 is transmitted through substantially the same region of the optical member 2 and incident on the imaging element 3. Further, it is preferable that the light reflected at the respective positions in the measurement region enter the limiting aperture 13 at an angle as close to parallel as possible. The optical member 2 may be in contact with the limiting aperture 13 or may be arranged away from it.

As shown in FIG. 1, an imaging lens 14 is arranged between the optical member 2 and the imaging element 3 to converge the first bundle of rays 7 and the second bundle of rays 9 transmitted through the optical member 2. The irradiation light reflected from the respective measurement regions 61 is incident on the first portion 8 and the second portion 10, respectively, deflected and phase-shifted, and reaches the imaging element 3.

The imaging element 3 includes, for example, a CMOS image sensor, or a CCD image sensor. The imaging element 3 is configured to image the intensity pattern of the first bundle of rays 7 and the intensity pattern of the second bundle of rays 9. The imaging element 3 measures by interfering the first bundle of rays 7 and the second bundle of rays 9 transmitted through the optical member 2.

Figure 3:
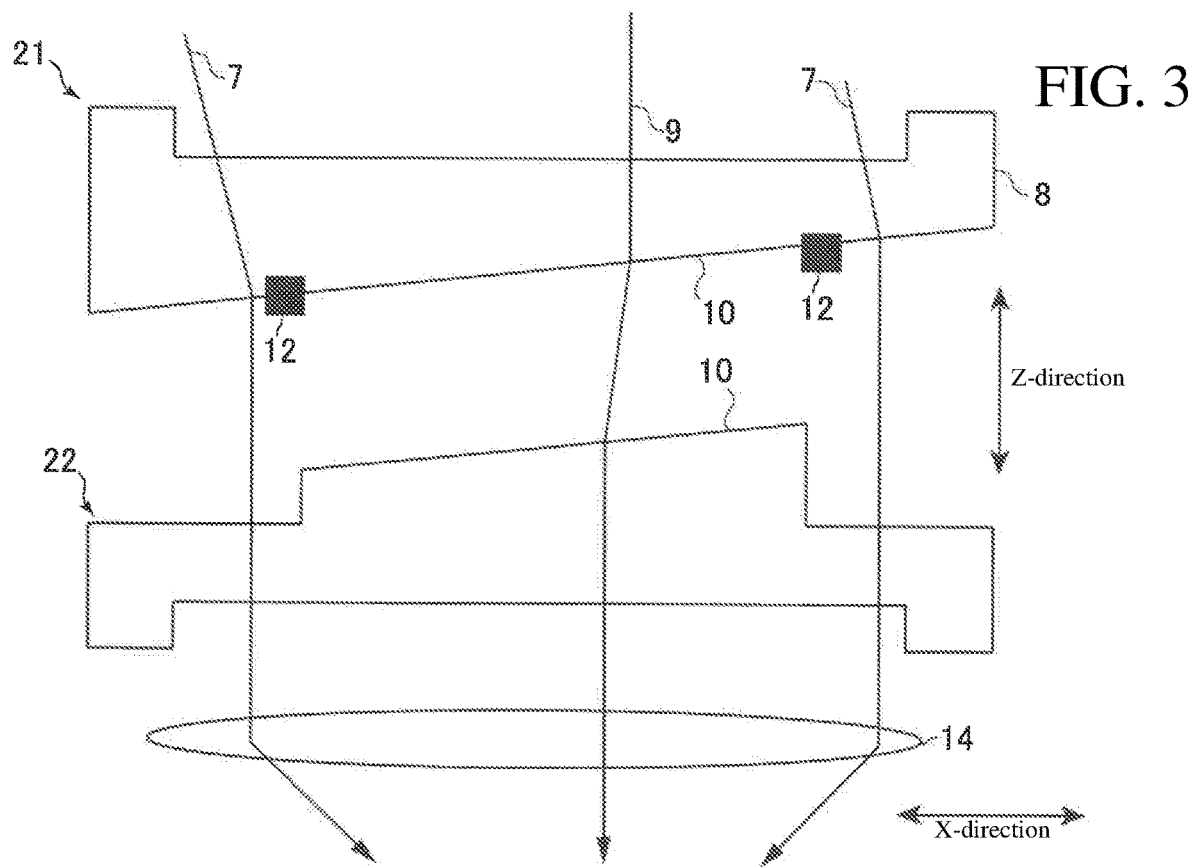
FIG. 3 is a diagram for explaining the directions of irradiation light passing through the first optical member and the second optical member according to the first embodiment.
Figure 5:
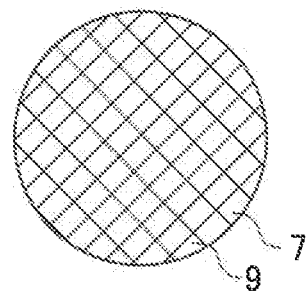
FIG. 5 is a diagram showing an example of the shape of the first bundle of rays and the second bundle of rays incident on the imaging element according to the first embodiment.

As shown in FIG. 3, in the first embodiment, in the surface of the first optical member 21 facing the second optical member 22, the first portion 8 and the second portion 10 are inclined at the same angle. Therefore, a plurality of second bundles of rays 9 transmitted through the second portion 10 are all refracted at the same angle. For this reason, the second bundle of rays 9 travels straight, and the first bundle of rays 7 travels so as to be deflected with respect to the second bundle of rays 9. Therefore, as shown in FIG. 5, in the imaging element 3, the first bundle of rays 7 and the second bundle of rays 9 are incident on the same imaging element 3. In FIG. 5, the first bundle of rays 7 and the second bundle of rays 9 are shown in a superimposed manner.

The control unit 4 controls the actuator 11 to move the second optical member 22. By moving the second optical member 22, the optical path composed of the first optical member 21 and the second optical member 22 is changed to thereby change the optical path length to change the phase of the second bundle of rays 9 to be transmitted. For example, the actuator 11 moves the first optical member 21 in the X-direction within a range of 10 This changes the phase difference between the first bundle of rays 7 and the second bundle of rays 9 reflected at different positions.

To the signal generator 5 of the displacement measurement device 100 in the first embodiment, a vibrator 15 arranged so as to be in contact with the object 6 for exciting acoustic wave vibration to the object 6 is connected via a cable. Specifically, the vibrator 15 is arranged so as to be in contact with the object 6, converts the AC electric signal from the signal generator 5 to mechanical vibration to excite vibration to the object 6.

The control unit 4 controls the vibration of the vibrator 15 and the timing of the radiation of the irradiation light of the irradiation unit 1 via the signal generator 5, and captures an image while changing the phase shift amount. The control unit 4 changes the phase shift amount by $\lambda/4$. At each phase shift amount (0, $\lambda/4$, $\lambda/2$, $3\lambda/4$), the control unit 4 captures a total of 37 image images of 32 pieces of images for the timing j (j=0 to 7) of the irradiation and 5 pieces of images at the time of extinction around each phase shift amount (0, $\lambda/4$, $\lambda2$, $3\lambda4$). Note that $\lambda$, is a wavelength of the irradiation light.

The control unit 4 processes the detection signal from each detecting element in the following procedures to acquire a moving image representing the vibration status. The control unit 4 measures, based on the interfered reflected light captured by the imaging element 3, the spatial distribution of the physical quantity caused by the propagation of vibration of the object 6 that varies periodically. For example, the control unit 4 generates, based on the interfered reflected light captured by the imaging element 3, a moving image relating to the propagation of vibration of the object 6.

The control unit 4 obtains the optical phase (phase difference between two optical paths when the phase shift amount is zero) $\Phi j$ by Equation (1) from the luminance value Ij0 to Ij3 of the images (4 sheets each) in which the timing j (j=0 to 7) of the radiation is the same and the phase shift amount varies by $\lambda/4$.

$$\Phi j = -\arctan\{(Ij3-Ij1)/(Ij2-Ij0)\} \quad (1)$$

Further, the control unit 4 performs the sine wave approximation on the optical phase $\Phi j$ by a least-squares method to obtain the approximation coefficients A, $\theta$, and C in Expression (2).

$$\Phi j = A \cos(\theta + j\pi/4) + C = B \exp(j\pi/4) + C \quad (2)$$

where B is a complex amplitude and is expressed by Expression (3).

$$B = A \exp(i\theta): \text{Complex amplitude} \quad (3)$$

Further, the control unit 4 constitutes and outputs a moving image (30 to 60 frames) for displaying the optical phase changes at each phase times $\xi$ ($0 \leq \xi < 2\pi$) of vibration, from the approximate expression obtained by removing the constant term C from Equation (2). In the above-described procedure, a spatial filter is appropriately applied to the complex amplitude B in order to remove noise. Further, Step of the phase shift amount or the radiation timing ($\kappa/4$ and T/8, respectively in the above example, where T is a period of vibration) is not limited thereto. In this case, the calculation expression is different from the above-described Expressions (1) to (3).

The control unit 4 applies the spatial filter and detects the discontinuous region of the vibration state as a defective portion of the object 6 from the above moving image. That is, the control unit 4 extracts the vibration discontinuous portion, based on the spatial distribution of the physical quantities. In a case where the shape of the object 6 itself contains irregularities, etc., even at the boundary of the flat portion and the uneven portion, the discontinuous of vibration state may occur. Therefore, the control unit 4 may detect the defective portion by considering the shape information on the object 6 so as not to detect it as a defect.

Effects of First Embodiment

In this embodiment, the following effects can be obtained.

In the first embodiment, as described above, the displacement measurement device 100 according to the first embodiment is provided with the optical member 2. The optical member 2 transmits the irradiation light reflected from or transmitted through mutually different points or regions of the object 6 in a state of being separated into a first bundle of rays and a second bundle of rays and interferes the transmitted first bundle of rays 7 and the second bundle of rays 9. The optical member 2 includes the first optical member 21 and the second optical member 22 arranged so as to face each other. The optical member 2 has the first portion 8 and the second portion 10. The first portion 8 is configured by at least one of the first optical member 21 and the second optical member 22 and changes the direction of the outgoing light with respect to the direction of the incident light by transmitting the first bundle of rays 7. The second portion 10 is configured by the first optical member 21 and the second optical member 22, and transmits the second bundle of rays 9 to change the phase of the second bundle of rays 9 with respect to the first bundle of rays 7. With this configuration, since there is no need to separate the first bundle of rays 7 and the second bundle of rays 9 in two directions, there is no need to provide an optical member (half mirror) for separating the light and an optical member (half mirror) for interfering the separated light. Further, by providing the first optical member 21 and the second optical member 22, there is no need to provide a phase shifter and a deflector to change the direction of the irradiation light, respectively. Consequently, the first optical member 21 and the second optical member 22 are provided instead of the phase shifter and the deflector, but there is no need to provide an optical member (half mirror) for separating the light and an optical member (half mirror) for interfering the separated light. Therefore, it is possible to reduce the number of components and suppress the increased in the size of the apparatus. Further, since there is no need to provide an optical member 2 for separating and interfering the irradiation light, it is possible to suppress the loss amount of light due to the reflection and transmission by the optical member 2. Further, by interfering the irradiation light reflected from the mutually different positions of the object 6, it is possible to reduce the directional dependency of the defect detection sensitivity.

In the first embodiment, as described above, at least one of the first optical member 21 and the second optical member 22 includes a compound lens pair in which the first portion 8 and the second portion 10 are integrated. This allows the compound lens pair in which the first portion 8 and the second portion 10 are integrated to have both the phase shift function for changing the phase of the second bundle of rays 9 and the deflection function for changing the traveling direction of the first bundle of rays 7. As a result, by using the compound lens pair, the traveling direction of the first bundle of rays 7 can be changed, and the phase of the second bundle of rays 9 can be shifted. Therefore, it is possible to reduce the number of components as compared with the case of providing a half mirror, a deflection means, and a phase shift means. It is also possible to suppress an increase in the size of the apparatus.

In the first embodiment, as described above, in the first optical member 21 and the second optical member 22, the first portion 8 is provided on the outer side, and the second portion 10 is provided on the inner side. With this, it is possible to interfere the first bundle of rays 7 deflected by the first portion 8 provided on the outer side and the second bundle of rays 9 shifted in the phase by the second portion 10 provided on the inner side, at the position of the imaging element 3.

Further, in the first embodiment, as described above, the optical member 2 is provided with the light shielding member 12 at the boundary between the first portion 8 and the second portion 10. This allows the second bundle of rays 9 transmitted through the second portion 10 of the first optical member 21 to transmit through the part of the second optical member 22 facing the first portion 8. Further, it is possible to suppress the first bundle of rays 7 transmitted through the first portion 8 of the first optical member 21 from transmitting through the second portion 10 of the second optical member 22. As a result, even if the optical path of the first bundle of rays 7 and the optical path of the second bundle of rays 9 are not separated from each other, it is possible to the suppress the first bundle of rays 7 and the second bundle of rays 9 from traveling to the wrong optical path.

Further, in the first embodiment, as described above, the optical member 2 is arranged close to the position of the limiting aperture 13 of the optical system to cause the irradiation light reflected from the object 6 to be incident on the imaging element 3. This allows the optical member 2 to transmit all the light coming from the measurement region 61 of the object 6, so that the first bundle of rays 7 and the second bundle of rays 9 reflected from the respective positions of the measurement region 61 of the object 6 can interfere with each other. Consequently, since many irradiation light is incident on the imaging element 3 and interferes with each other, it is possible to image the interference of the irradiation light of the entire measurement region 61 of the object 6.

Further, in the first embodiment, as described above, in the optical member 2, the first portion 8 formed in an annular shaped as viewed in the incident direction of the irradiation light is arranged adjacently so as to surround the circular second portion 10. Thus, the first portion 8 for changing the traveling direction of the first bundle of rays 7 and the second portion 10 for shifting the phase of the second bundle of rays 9 adjoin. Therefore, it is possible to reduce the space as compared with the conventional one in which a phase shift means for shifting the phase and a deflection means for deflecting the traveling direction of the irradiation light are provided separately. This also makes it possible to suppress the enlargement of the apparatus.

Further, in the first embodiment, as described above, the surface of the first portion 8 of the first optical member 21 facing the second optical member 22 and the opposing surfaces of the second portion 10 of the first optical member 21 and the second portion 10 of the second optical member 22 are arranged so as to be inclined with respect to a direction perpendicular to the incident direction of the irradiation light. Further, the mutually opposing surfaces of the second portion 10 of the first optical member 21 and the second portion 10 of the second optical member 22 are arranged substantially in parallel with each other. With this, since the light transmitted through the first portion 8 is transmitted through the second optical member 22 after being refracted by the first portion 8 of the first optical member 21, it is possible to change the traveling direction of the first bundle of rays 7. On the other hand, even if the light transmitted through the second portion 10 is refracted due to the inclination of the second portion 10 of the first optical member 21, since the second portion 10 of the second optical member 22 is inclined in the same manner as the second portion 10 of the first optical member 21, the second bundle of rays 9 is further refracted when the light is transmitted through the second portion 10 of the second optical member 22, and returns in the original direction. Therefore, it is possible to transmit the second bundle of rays 9 without changing the traveling direction. Further, by moving the second optical member 22 in a direction perpendicular to the traveling direction of the second bundle of rays 9, the optical path of the second bundle of rays 9 transmitted through the second portion 10 can be be easily increased so as to be larger than the optical path length of the first bundle of rays 7 transmitted through the first portion 8. Consequently, by the difference in the optical path length, it is possible to easily shift the phase difference between the first bundle of rays 7 transmitted through the first portion 8 and incident on the imaging element 3 and the second bundle of rays 9 transmitted through the second portion 10 and incident on the imaging element 3.

Second Embodiment

Next, referring to FIG. 1 and FIG. 6 to FIG. 9, a second embodiment will be described. In this second embodiment, an example will be described in which the first optical member 21 is formed to have the second portion 10 formed in a circular shape, and the first portion 8 is formed in a cone shape from which the head portion is removed as viewed from the side, and is formed such that the tip end thereof is in contact with the second portion 10. Note that the same configuration as that of the above-described first embodiment is denoted by the same reference numeral as that of the first embodiment, and the description will be omitted. Further, in the second embodiment, an example is described in which the first bundle of rays 7 and the second bundle of rays 9 reflected at the same point of the object 6 will be imaged at the mutually different points or regions of the imaging element 3, but the relation between the object and the image can be interchangeable from the principle of conjugate relation of the imaging optical system. That is, according to the description in the second embodiment, it is established that the first bundle of rays 7 and the second bundle of rays 9 reflected at mutually different points or regions of the object 6 are imaged at the same point of the imaging element 3.

Figure 6:
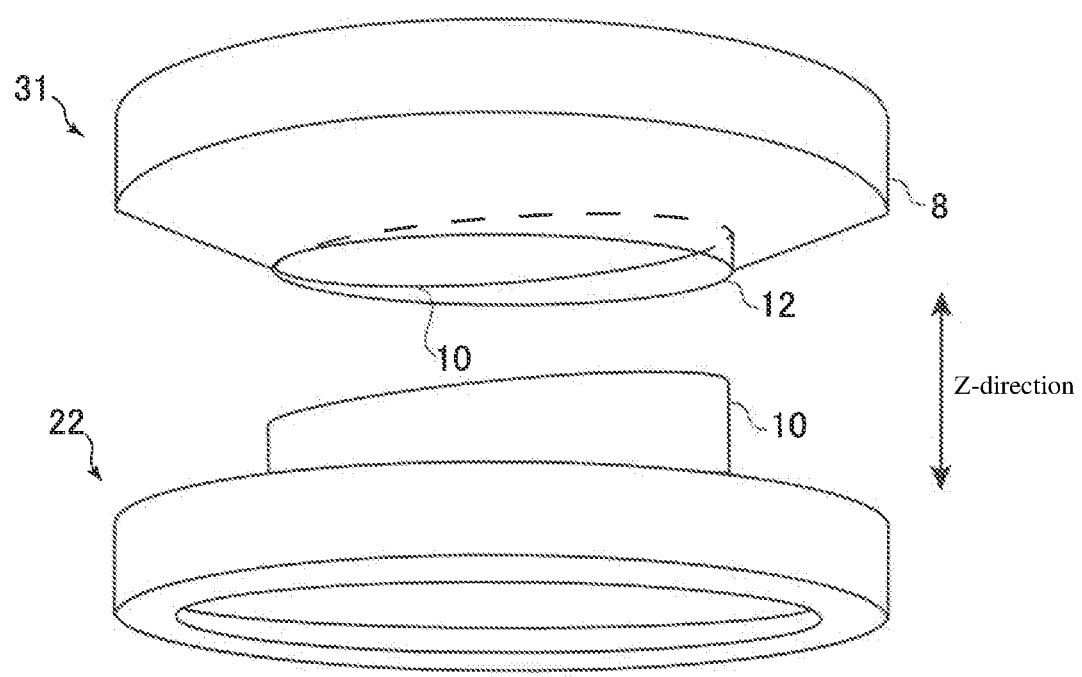
FIG. 6 is a diagram showing an example of the first optical member and the second optical member according to the second embodiment.

As shown in FIG. 6, in the first optical member 31 of the second embodiment, the second portion 10 is formed in a circular shape, and the first portion 8 is formed in a cone shape from which the head portion is removed, as viewed from the side, and the tip end is formed such that the tip end thereof is in contact with the second portion 10.

Figure 7:
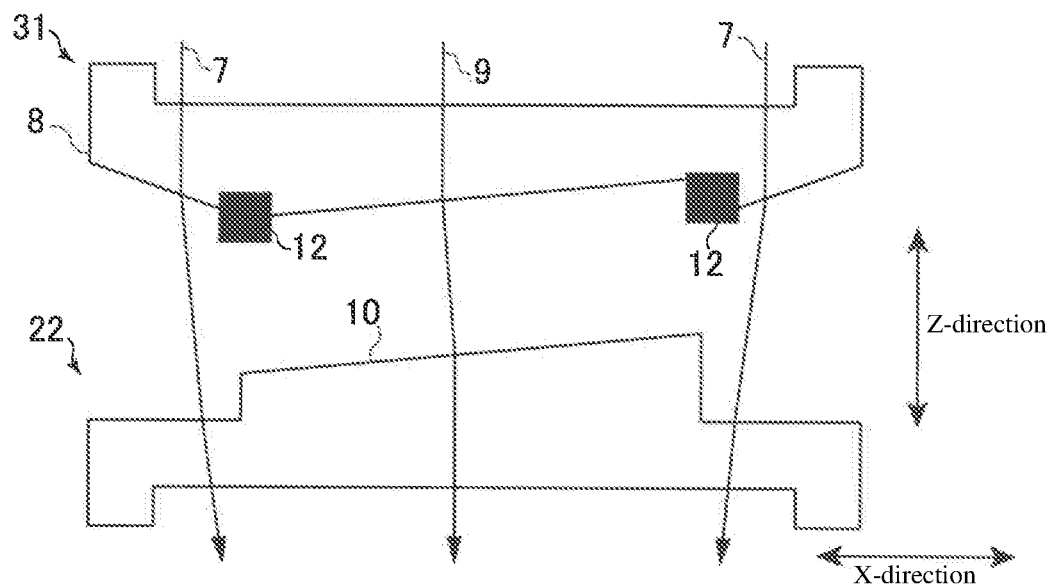
FIG. 7 is a diagram for explaining the directions of the irradiation light passing through the first optical member and the second optical member according to the second embodiment.

As shown in FIG. 7, the first bundle of rays 7 and the second bundle of rays 9 travel through the optical member 2. A plurality of second bundles of rays 9 transmitted through the second portion 10 of the first optical member 31 and the second optical member 22 travels straight and is incident on the imaging lens 14, and is imaged in dots on the imaging element 3. On the other hand, the first bundle of rays 7 transmitted through the first portion 8 of the first optical member 31 and the second optical member 22 is deflected at the first portion 8 of the first optical member 31 and is incident on the imaging lens 14, and is imaged on the imaging element 3.

Figure 8:
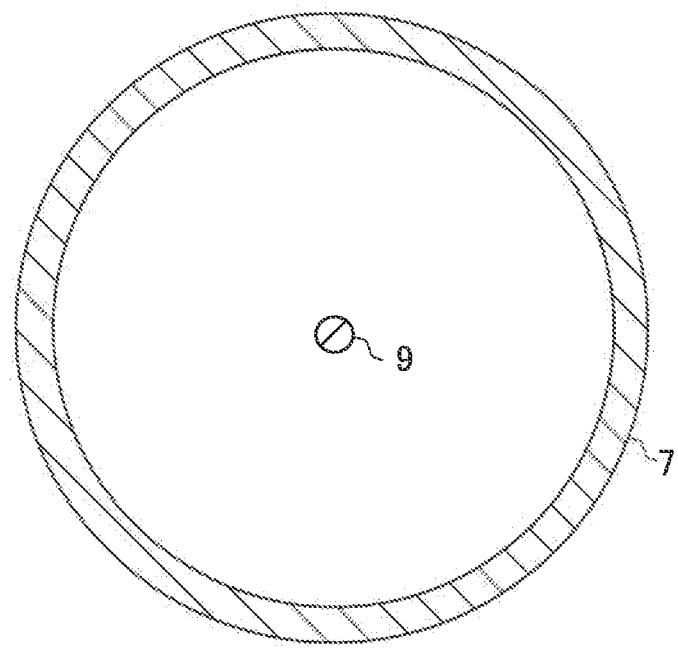
FIG. 8 is a diagram showing an example of a shape of the first bundle of rays and that of the second bundle of rays incident on the imaging element according to the second embodiment.

As shown in FIG. 6, since the first portion 8 of the first optical member 31 is formed in a truncated cone shape, the first bundle of rays 7 is given a conical deflection, and in the imaging element 3, the first bundle of rays 7 is imaged annularly around the second bundle of rays 9 imaged in dots. As a result, as shown in FIG. 8, in the imaging element 3, the second bundle of rays 9 is positioned at the center of the first bundle of rays 7.

Figure 9:
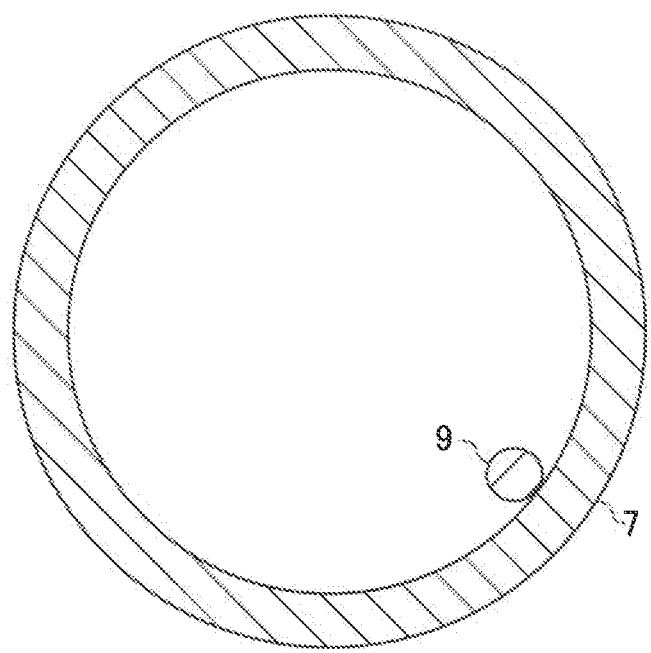
FIG. 9 is a diagram showing another example of a shape of the first bundle of rays and that of the second bundle of rays incident on the imaging element according to the second embodiment.

Also, as shown in FIG. 9, by deflecting the inclination angle of the first portion 7, in the imaging element 3, the second bundle of rays 9 is incident on the imaging element 3 adjacently to the first bundle of rays 7.

Effects of Second Embodiment

In this second embodiment, the following effects can be obtained.

In the second embodiment, in the first optical member 21, the second portion 10 is formed in a circular shape, and the first portion 8 is formed in a cone shape from which the head portion is removed as viewed from the side, and the tip end is formed to contact the second portion 10. Thus, in the imaging element 3, it is possible to cause the first bundle of rays 7 deflected annularly to be incident around the second bundle of rays 9.

The other effects of the second embodiment are the same as those of the above-described first embodiment.

Third Embodiment

Next, referring to FIG. 1 and FIG. 10 to FIG. 12, a third embodiment will be described. In this third embodiment, the first portion 8 of the first optical member 41 is formed in a polygon pyramid shape from which the head portion is removed as viewed from the side. Note that the same component as that of the above-described first embodiment is denoted by the same reference numeral as that of the first embodiment, and the description will be omitted. In the third embodiment, an example will be described in which the first bundle of rays 7 and the second bundle of rays 9 reflected at the same point of the object 6 are imaged at mutually different points or regions of the imaging element 3. However, the relation between the object and the image can be interchangeable from the principle of the conjugate relation of the imaging optical system. That is, according to the description in the third embodiment, it is established that the first bundle of rays 7 and the second bundle of rays 9 reflected at mutually different points or regions of the object 6 are imaged at the same point of the imaging element 3.

Figure 10:
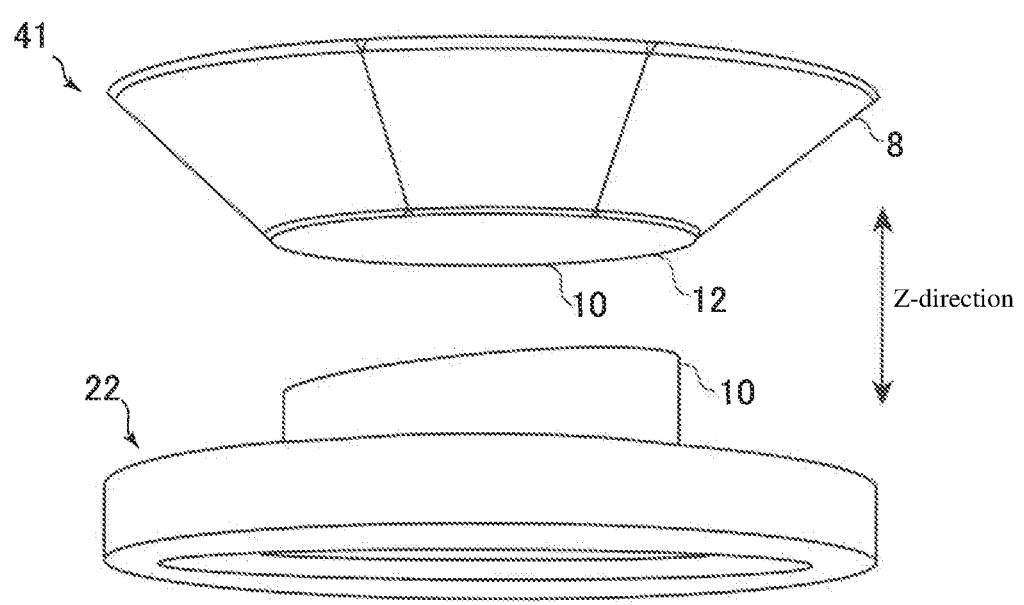
FIG. 10 is a diagram showing an example of the first optical member and the second optical member according to the third embodiment.

As shown in FIG. 10, the first portion 8 is formed in a polygonal pyramid shape from which the head portion is removed as viewed from the side. Note that the second portion 10 is machined to be a circular shape. The second portion 10 may be circumferentially surrounded by a light shielding member 12 to make it circular, and the second portion 10 may be formed in a circular shape.

Figure 11:
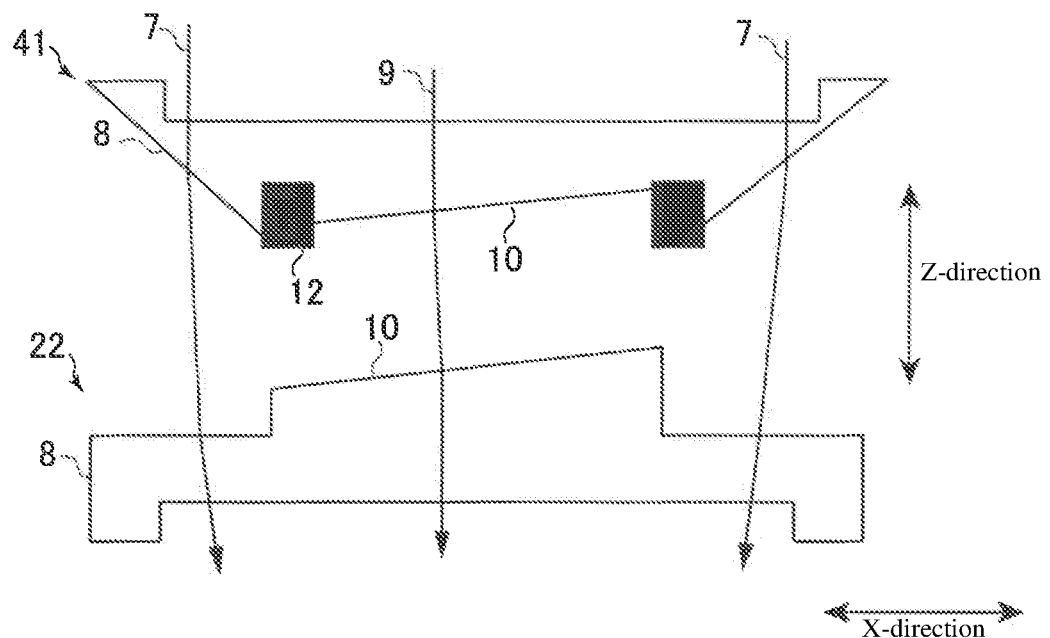
FIG. 11 is a diagram for explaining the directions of the irradiation light passing through the first optical member and the second optical member according to the third embodiment.

As shown in FIG. 11, the first bundle of rays 7 and the second bundle of rays 9 travel through the optical member 2. The first bundle of rays 7 is incident on the periphery of the portion of the imaging element 3 where the second bundle of rays 9 is incident.

Figure 12:
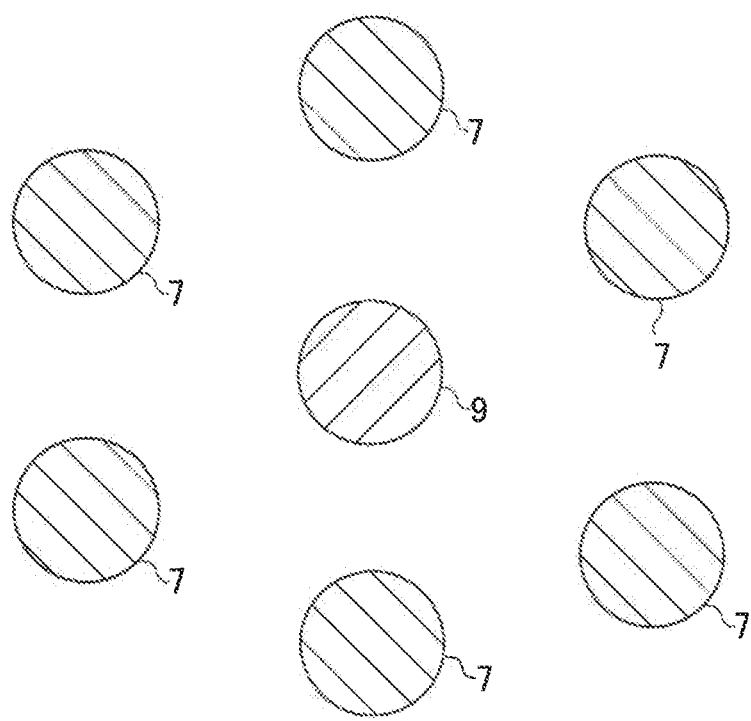
FIG. 12 is a diagram showing an example of a shape of the first bundle of rays and the second bundle of rays incident on the imaging element according to the third embodiment.

In the third embodiment, in the imaging element 3 as shown in FIG. 12, a plurality of first bundles of rays 7 are incident around the second bundle of rays 9 in an annular shape. FIG. 12 shows a case in which the number of surfaces is six. Depending on the number of surfaces, the number of the first bundle of rays 7 incident on the imaging element 3 changes. Note that as the number of surfaces increases, the first bundles of rays 7 adjoins each other, and finally approaches a single circular ring shape as shown in FIG. 8 of the second embodiment.

Effects of Third Embodiment

In the third embodiment, the following effects can be acquired.

In the third embodiment, in the first optical member 41, the first portion 8 is formed in a polygonal pyramid shape from which the head portion is removed. With this, it is possible to cause the first bundle of rays 7 deflected around the second bundle of rays 9 to be incident around the second bundle of rays 9.

The other effects of the third embodiment are the same as those of the first embodiment.

Fourth Embodiment

Referring to FIG. 1 and FIG. 13 to FIG. 17, a fourth embodiment will be described. In this fourth embodiment, the optical member 2 further includes a third optical member 53.

Figure 13:
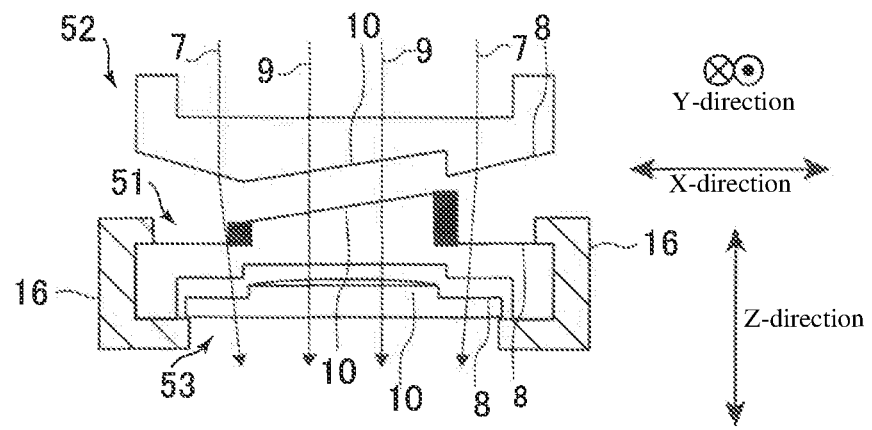
FIG. 13 is a diagram showing an example of the first optical member and the second optical member according to the fourth embodiment. (a) of FIG. 13 is a diagram showing the first optical member, the second optical member, and the third optical member as viewed from the front. (b) of FIG. 13 is a diagram showing the first optical member and the third optical member as viewed from the side.
Figure 13:
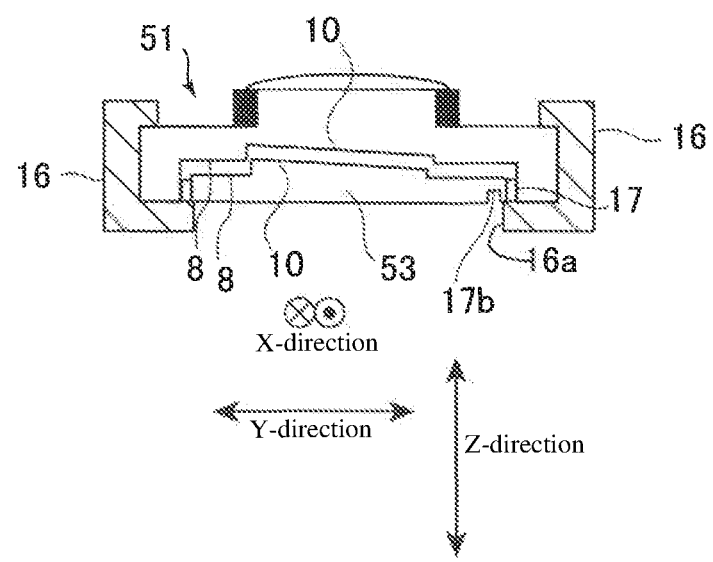

As shown in (a) in FIG. 13, in the fourth embodiment, the second optical member 52, the first optical member 51, and the third optical member 53 are arranged in this order in the incident direction of the irradiation light.

In the first optical member 51, the second optical member 52, and the third optical member 53, the first portion 8 is arranged on the outer side, and the second portion 10 is arranged on the inner inside. The surface of the first portion 8 of the first optical member 51 facing the second optical member 52 is arranged so as to be inclined in a direction (X-direction) perpendicular to the incident direction of the irradiation light. Therefore, the irradiation light (first bundle of rays 7) transmitted through the second optical member 52 is refracted at the boundary between the first optical member 51 and air.

As shown in (b) in FIG. 13, the first portion 8 of the first optical member 51 and the first portion 8 of the third optical member 53 extend in a direction (X-direction) perpendicular to the irradiation light so as to be in parallel to each other. Therefore, the light refracted when incident on the first portion 8 of the first optical member 51 is transmitted through the third optical member 53 without changing the angle in the Z-direction. In (b) of FIG. 13, the second optical member 52 is omitted.

As shown in (a) of FIG. 13, the surface of the second portion 10 of the second optical member 52 facing the first optical member 51 and the surface of the second portion 10 of the first optical member 51 facing the second optical member 52 are inclined in a first direction (X-direction) perpendicular to the incident direction (Z-direction) of the irradiation light.

As shown in (b) of FIG. 13, the surface of the second portion 10 of the first optical member 51 facing the third optical member 53 and the surface of the second portion 10 of the third optical member 53 facing the first optical member 51 are inclined in a second direction (Y-direction) perpendicular to the incident direction (Z-direction) of the irradiation light. Therefore, in the irradiation light passing through the second portion 10, the direction of the outgoing light is inclined in the X-direction by the second portion 10 of the first optical member 51 and returns in the original direction when incident on the second optical member 52. Then, the direction of the light emitting the second portion 10 of the second optical member 52 is inclined in the Y-direction and returns in the original direction when incident on the third optical member 53. That is, the irradiation light will consequently travel straight through the first optical member 51, the second optical member 52, and the third optical member 53. Then, the second bundle of rays 9 transmitted through the second portion 10 reaches the imaging element 3 (see FIG. 1).

Figure 14:
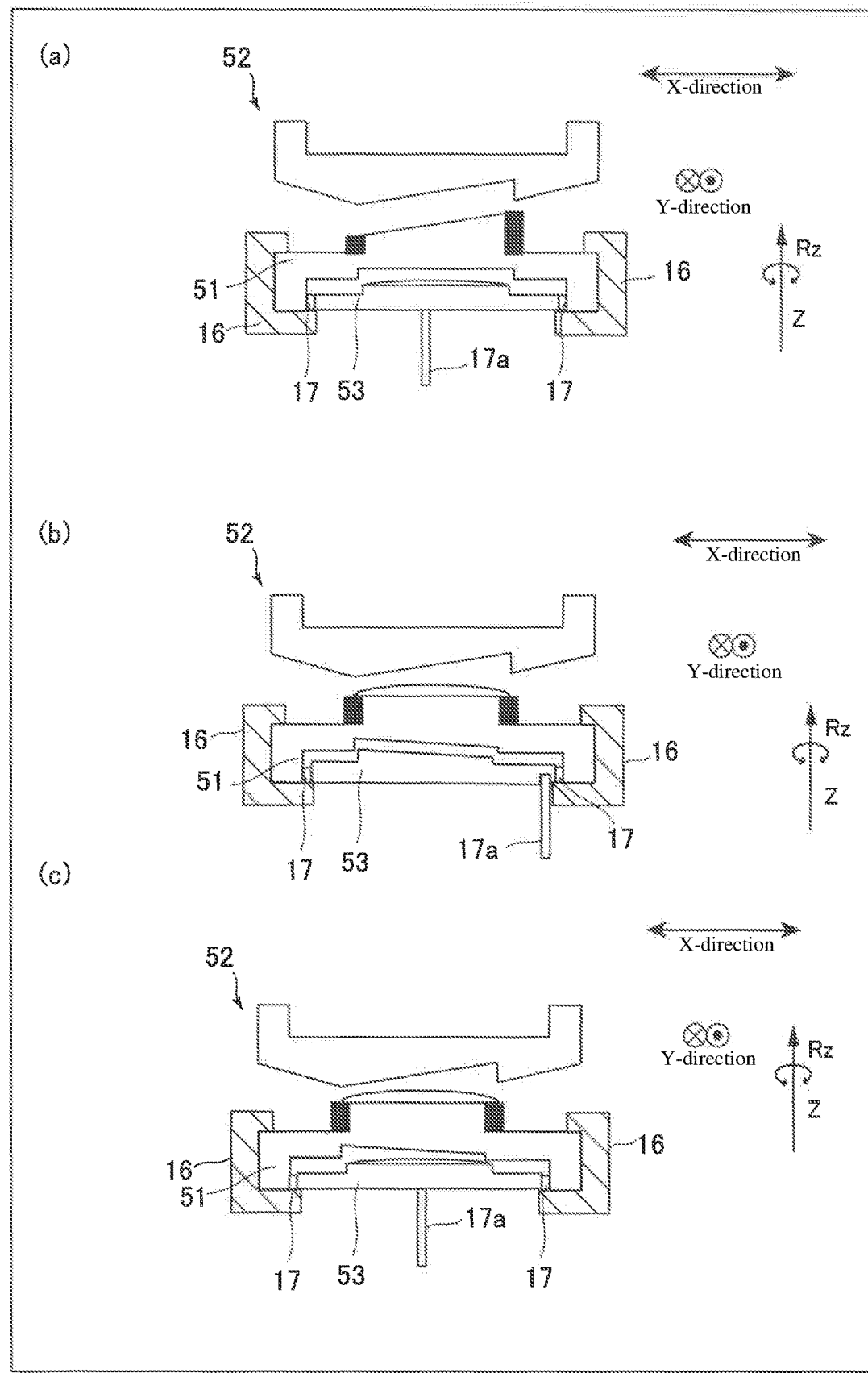
FIG. 14 is a diagram showing a rotation mechanism according to the fourth embodiment. (a) of FIG. 14 is a diagram showing a state before rotating. (b) of FIG. 14 is a diagram showing a state in which the first optical member and the third optical member have been rotated. (c) of FIG. 13 is a diagram showing a state in which only the third optical member has been rotated.

As shown in (a) in FIG. 14, the rotation mechanism includes a first rotation mechanism 16 for integrally rotating the first optical member 51 and the third optical member 53 with respect to the second optical member 52, and a second rotation mechanism 17 for rotating the third optical member 53 with respect to the first optical member 51. Note that in (a) of FIG. 14, (b) of FIG. 14, and (c) of FIG. 14, the first rotation mechanism 16 is hatched.

As shown in (a) in FIG. 14, the first rotation mechanism 16 is attached to the first optical member 51. The first rotation mechanism 16 is, for example, a rotatable holder. The first rotation mechanism 16 has a portion for mounting the third optical member 53, and the third optical member 53 is mounted on the first rotation mechanism 16. Therefore, by the first rotation mechanism 16, when rotating the first optical member 51, the third optical member 53 which is placed on the first rotation mechanism 16 also rotates at the same time. Therefore, the first rotation mechanism 16 can integrally rotate the first optical member 51 and the third optical member 53.

As shown in (a) in FIG. 14, the second rotation mechanism 17 is attached to the third optical member 53 from the side opposite to the side facing the first optical member 51 of the third optical member 53. The second rotation mechanism 17 is rotated by, for example, a jig 17a. The third optical member 53 is provided with a hole 17b for attaching (inserting) the jig 17a (see FIG. 13 (b)). Further, the first optical member 51 is provided with a hole 16a (see FIG. 13 (b)) for rotating the third optical member 53 by attaching the jig 17a to the third optical member 53. When the jig 17a is rotated, the first rotation mechanism 16 and the first optical member 51 do not rotate. The second rotation mechanism 17 is configured to rotate the third optical member 53 when the attached jig 17a is rotated.

Figure 15:
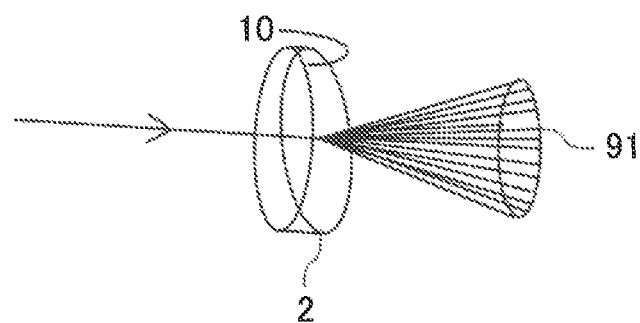
FIG. 15 is a diagram showing directions in which the irradiation light is refracted when the optical member is rotated.

As shown in FIG. 15, the second portion 10 of the optical member 2 has a property of refracting the irradiation light in the inclined direction. Further, the optical member 2 can change the direction of refracting the irradiation light by rotating.

Based on FIG. 14, the method of adjusting the second bundle of rays 9 in the X-direction and the Y-direction will be described.

(a) of FIG. 14 shows the arrangement of the first optical member 51, the second optical member 52, and the third optical member 54 before the adjustment.

As shown in (b) in FIG. 14, the first optical member 51 and the third optical member 53 are rotated at the same time by the first rotation mechanism 16. As a result, the direction of the outgoing light can be adjusted in the Y-direction which is a direction in which the the second portion 10 of the first optical member 51 facing the second portion 10 of the second optical member 52, without changing the direction of the outgoing light in the X-direction which is the direction in which the second portion 10 of the first optical member 51 facing the second portion 10 of the third optical member 53. Note that in (b) of FIG. 14, an example in which the first optical member 51 and the second optical member 52 are rotated by 90 degrees with respect to (a) of FIG. 14 is shown, but the rotation angle may be smaller than 90 degrees.

Next, as shown in (c) of FIG. 14, by rotating the third optical member 53 by the second rotation mechanism 17, without changing the direction of the outgoing light in the Y-direction which is the direction in which the second portion 10 of the first optical member 51 facing second portion 10 of the second optical member 52 extends, the direction of the outgoing light refracting in the X-direction which is the direction in which the second portion 10 of the first optical member 51 facing the second portion 10 of the third optical member 53 extends, is adjusted. Note that (c) of FIG. 14 shows an example of rotating by 90 degrees with respect to (b) of FIG. 14, the rotation angle may be smaller than 90 degrees.

Based on FIG. 16 and FIG. 17, the change in the position of the second bundle of rays 9 transmitted through the second portion 10 of the first optical member 51, the second optical member 52, and the third optical member 53 will be described.

Figure 16:
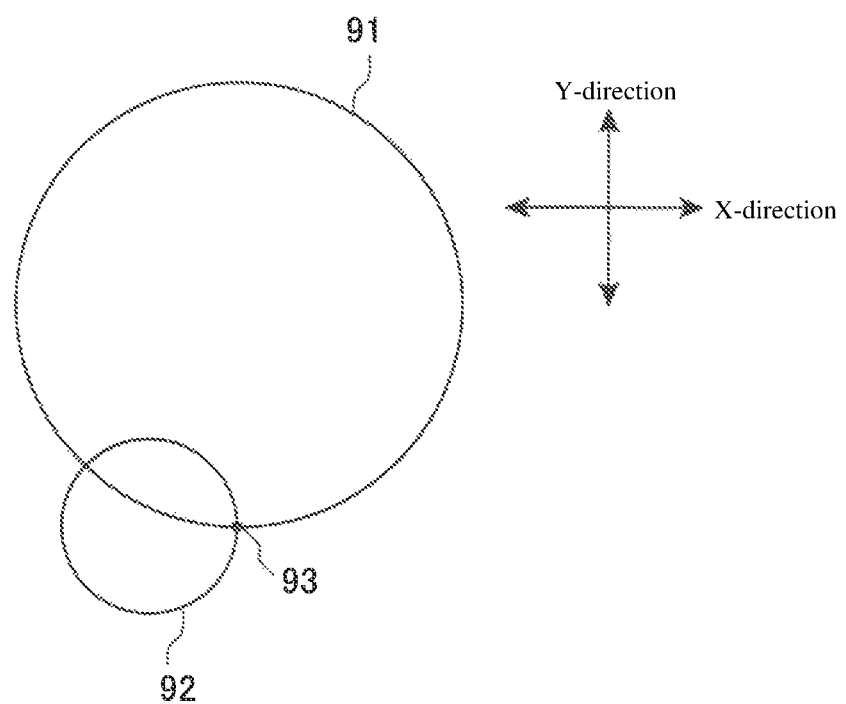
FIG. 16 is a diagram showing the trajectory drawn by the irradiation light when the first rotation mechanism and the second rotation mechanism are rotated.
Figure 17:
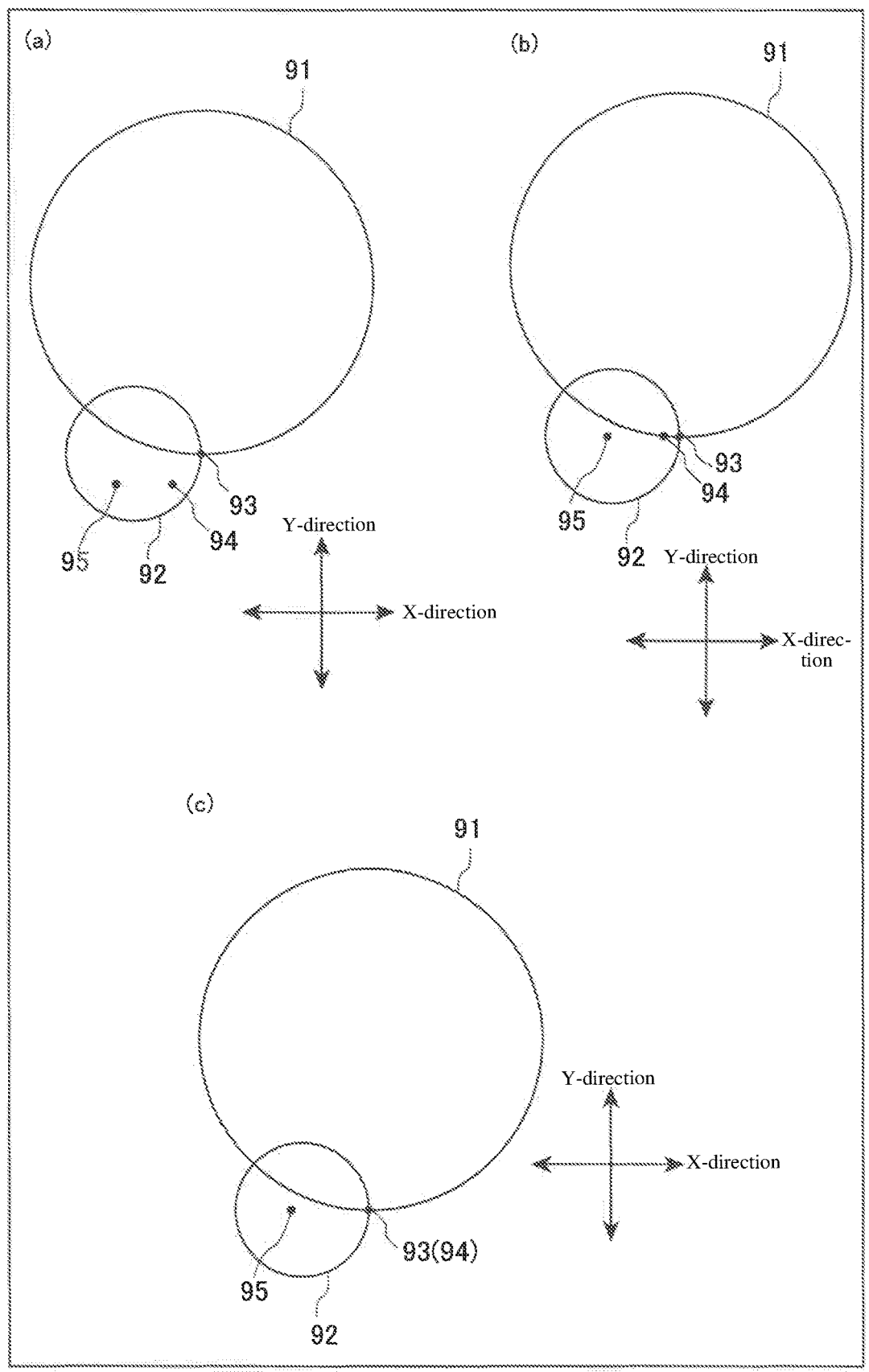
FIG. 17 is a diagram showing the change in the position of the second bundle of rays when the first rotation mechanism and the second rotation mechanism are rotated. (a) of FIG. 17 is a diagram showing the state before the rotation of the first rotation mechanism and the second rotation mechanism. (b) of FIG. 17 is a diagram showing the state after the rotation of the the first rotation mechanism. (c) of FIG. 17 is a diagram showing the state after the rotation of the second rotation mechanism.

In FIG. 16 and FIG. 17, the position where the second bundle of rays 9 transmitted through the first optical member 51, the second optical member 52, and the third optical member 53 is irradiated on the imaging element 3 is indicated by a point 93. The locus of the irradiation light transmitted through the second portion 10 of the second optical member 52 and the third optical member 53 when the first optical member 51 and the third optical member 53 are integrally rotated by the first rotation mechanism 16 is indicated by a circle 91. The locus of the irradiation light transmitted through the second portion 10 of the first optical member 51, the second optical member 52 and the third optical member 53 when the third optical member 53 is rotated by the second rotation mechanism 17 is indicated by a circle 92. Further, the ideal position of (adjustment position) of the second bundle of rays 9 is indicated by a point 94. Further, the position of the first bundle of rays 7 transmitted through the first portion 8 of the first optical member 51, the second optical member 52, and the third optical member 53 is indicated a point 95.

As shown in (a) of FIG. 17, when the second bundle of rays 9 transmitted through the second portion 10 of the first optical member 51, the second optical member 52, and the third optical member 53 is irradiated at the position of the point 93, it is adjusted so as to be irradiated at the position of the point 94.

As shown in (b) in FIG. 17, when the position in the Y-direction is adjusted by rotating the second rotation mechanism 17, the point 93 moves from the position of (a) of FIG. 17 (a) in the Y-direction. At this time, the position of the point 94 in the Y-direction and the position of the point 93 in the Y-direction are adjusted by the first rotation mechanism 16 so as to be the same.

As shown in (c) in FIG. 17, when the position in the X-direction is adjusted by rotating the first rotation mechanism 16, the point 93 moves from the position of (b) of FIG. 17 in the X-direction. At this time, it is adjusted such that the point 93 and the point 94 overlap with each other by the first rotation mechanism 16. As a result, the position at which the first bundle of rays 7 is irradiated and the position at which the second bundle of rays 9 is irradiated are adjusted.

Effects of Fourth Embodiment

In this fourth embodiment, the following effects can be obtained.

In the fourth embodiment, the third optical member 53 arranged to face the first optical member 51 is provided. The surface of the second portion 10 of the first optical member 51 facing the second optical member 52 and the surface of the second portion 10 of the second optical member 52 facing the first optical member 51 is inclined in the first direction perpendicular to the incident direction of the irradiation light. The surface of the second portion 10 of the first optical member 51 facing the third optical member 53 and the surface of the second portion 10 of the third optical member 53 facing the first optical member 51 are inclined in a second direction perpendicular to incident direction of the irradiation light and intersecting with the first direction. It is further equipped with a rotation mechanism for changing the relative angle between the first direction and the second direction by rotating the third optical member 53. With this, by changing the relative angle between the first direction and the second direction by rotating the third optical member 53 by the rotation mechanism, it is possible to change the angle of the surface of the optical member 2 in which the second bundle of rays 9 is incident or emitted with respect to the illumination direction, so that it is possible to change the refraction angle of the second bundle of rays 9. Therefore, since the position at which the second bundle of rays 9 is irradiated can be adjusted, the relative position between the first bundle of rays 7 and the second bundle of rays 9 can be adjusted. Consequently, even when there is a manufacturing error in the optical member 2, by adjusting the relative position between the first bundle of rays 7 and the second bundle of rays 9, it is possible to suppress the occurrence of the individual difference in the displacement measurement device 100 (interference image imaging apparatus).

In the fourth embodiment, the rotation mechanism is provided with the first rotation mechanism 16 for integrally rotating the first optical member 51 and the third optical member 53 relative to the second optical member 52. Thus, by integrally rotating the first optical member 51 and the third optical member 53, without changing the relative position between the first optical member 51 and the third optical member 53, it is possible to change the relative position between the second optical member 52 and the first optical member 51. With this, without changing the refraction angle of the second bundle of rays 9 in the second direction, it is possible to adjust the refraction angle of the second bundle of rays 9 in the first direction.

In the fourth embodiment, the rotation mechanism is further provided with, in addition to the first rotation mechanism 16, the second rotation mechanism 17 for rotating the third optical member 53 relative to the first optical member 51. With this, it is possible to change the relative position between the first optical member 51 and the second optical member 52 by the first rotation mechanism 16 and change the relative position between the first optical member 51 and the second optical member 52 by the second rotation mechanism 17. With this, it is possible to adjust, in addition to the refraction angle of the second bundle of rays 9 in the first direction, the refraction angle of the second bundle of rays 9 in the second direction.

In the fourth embodiment, the second optical member 52, the first optical member 51, and the third optical member 53 are arranged in this order in the incident direction of the irradiation light. With this, it is possible to change the direction of the irradiation light whose phase has been changed by the second optical member 52 and the first optical member 51. Accordingly, the relative position between the irradiation light whose phase has been changed and the irradiation light which has been deflected by the second optical member 52 or the first optical member 51 can be adjusted.

The other effects of the fourth embodiment are the same as those of the first embodiment.

Fifth Embodiment

Next, referring to FIG. 1 and FIG. 18 to FIG. 20, a fifth embodiment will be described. In this fifth embodiment, unlike the fourth embodiment, by rotating the optical member 2 with the first rotation mechanism 16 or the second rotation mechanism 17, the transmission direction of the second bundle of rays 9 is changed.

Figure 18:
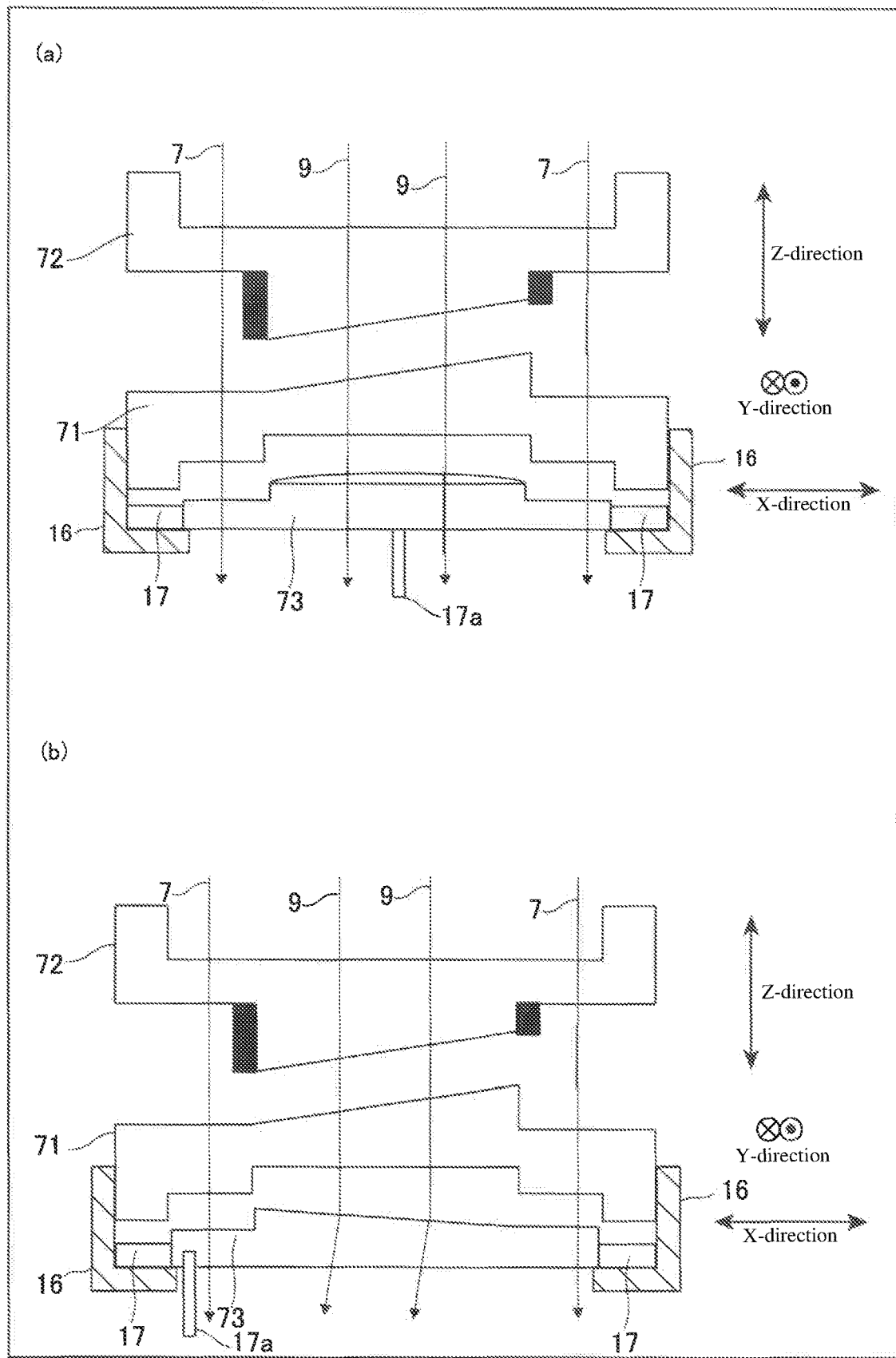
FIG. 18 is a diagram showing the first optical member, the second optical member and the third optical member according to the fifth embodiment. (a) of FIG. 18 is a diagram showing the state before the rotation of the third optical member. (b) of FIG. 18 is a diagram showing the state after the rotation of the third optical member by the second rotation mechanism.

In the fifth embodiment, as shown in FIG. 18, the second optical member 72, the first optical member 71, and the third optical member 73 are arranged in this order in the incident direction of the irradiation light.

As shown in (a) of FIG. 18, the opposing surfaces of the second optical member 72 and the first optical member 71 are arranged in parallel to each other. Further, the opposing surfaces of the first optical member 71 and the third optical member 73 are arranged in parallel to each other. Therefore, the irradiation light travels straight through the second optical member 72, the first optical member 71, and the third optical member 73.

As shown in (b) in FIG. 18, when the third optical member 73 is rotated by the second rotation mechanism 17, the outer side portions of the opposing surfaces of the third optical member 73 and the first optical member 71 do not cause deflection of the irradiation light because they are in parallel to each other. On the other hand, in the inner side portions of the opposing surfaces of the third optical member 73 and the first optical member 71, the inner side surface of the third optical member 73 is inclined with respect to the opposing inner side surface of the first optical member 71. Therefore, when entering the third optical member 73, the irradiation light is refracted and deflected in the X-direction.

Figure 19:
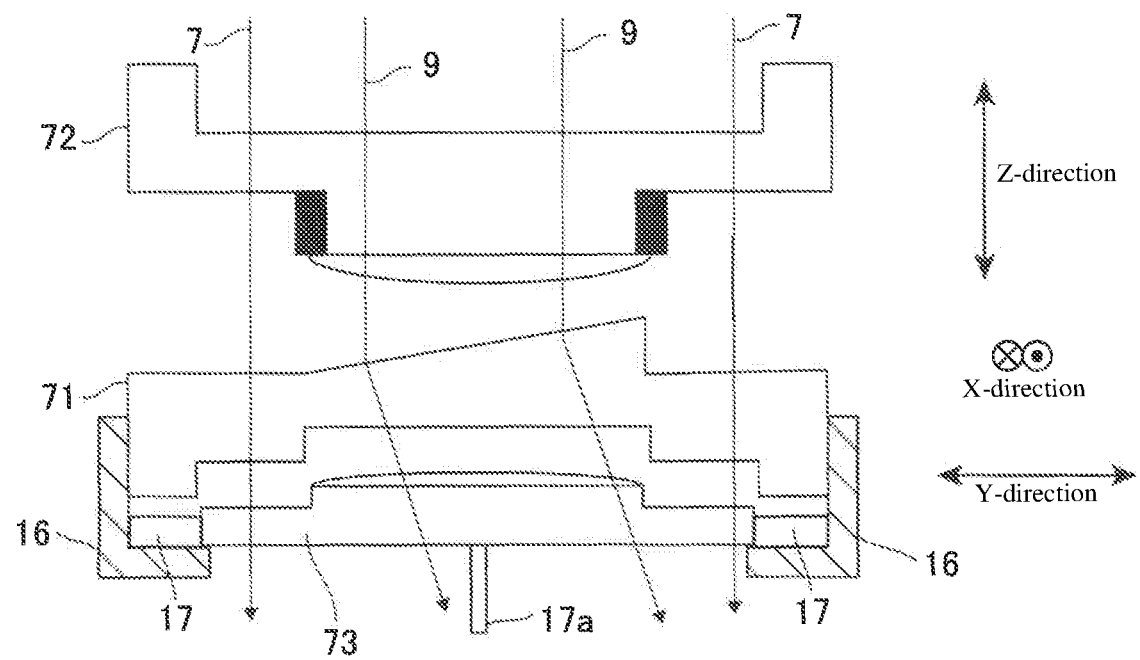
FIG. 19 is a side view showing the state after the rotation of the first optical member by the first rotation mechanism.

FIG. 19 is a side view (Y-direction) of a state in which the first optical member 71 and the third optical member 73 are rotated by the first rotation mechanism 16. When the first optical member 71 and the third optical member 73 are rotated by the first rotation mechanism 16, the first optical member 71 facing the inner side surface of the second optical member 72 is inclined with respect to the inner side surface of the second optical member 72, and therefore the irradiation light (second bundle of rays 9) is refracted in the Y-direction, and deflection occurs. On the other hand, since the inner side portion of the opposing surfaces of the third optical member 73 and the first optical member 71 are in parallel to each other, the deflected irradiation light is transmitted through the third optical member 73 without further being refracted.

Figure 20:
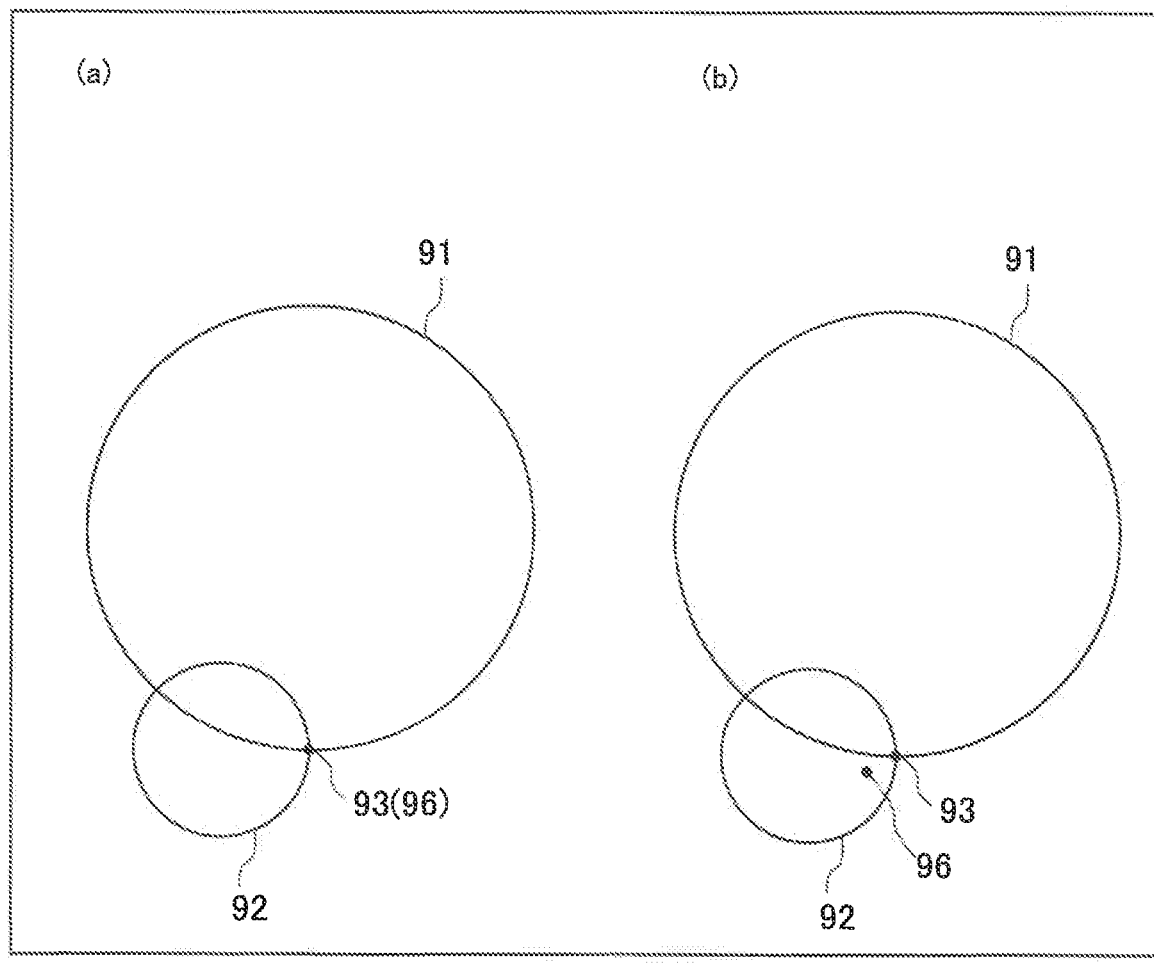
FIG. 20 is a diagram for explaining the deflection of the first bundle of rays according to the fifth embodiment. (a) of FIG. 20 is a diagram before the deflection. (b) of FIG. 20 is a diagram after the deflection.

As shown in (a) of FIG. 20, before the adjustment, the irradiation light transmitted through the outer side portion of the first optical member 71, the second optical member 72, and the third optical member 73 and the irradiation light transmitted through the inner side portion thereof are irradiated at the position of the point 93. Then, as shown in (b) in FIG. 20, by rotating the first rotation mechanism 16 or the second rotation mechanism 17, the irradiation light passing through the inner side portion is irradiated at the position of the point 96.

Effects of Fifth Embodiment

In the fifth embodiment, the following effects can be obtained.

In the fifth embodiment the optical member 2 and the rotation mechanism are provided. The optical member 2 transmits the irradiation light reflected by or transmitted through mutually different points or regions of the object 6 in a state of being separated into a first bundle of rays 7 and a second bundle of rays 9 and interferes the transmitted first bundle of rays 7 and the transmitted second bundle of rays 9 with each other. The rotation mechanism rotates the optical member 2 and at least a part of the optical member 2. The optical member 2 includes the first optical member 71, the second optical member 72, and the third optical member 73. The rotation mechanism rotates at least one of the first optical member 71 and the third optical member 73. With this, it is configured to change the relative angle between the first bundle of rays 7 and the second bundle of rays 9. The first optical member 71 and the second optical member 72 are configured to transmit the second bundle of rays 9 to change the phase of the second bundle of rays 9. Therefore, there is no need to provide an optical member (half mirror) for separating the light and an optical member (half mirror) for interfering the separated light, since there is no need to separate the irradiation light in two directions. Also, by providing the first optical member 71 and the second optical member 72, there is no need to provide a phase shifter. In addition, a rotation mechanism does not require a deflector. Consequently, the first optical member 71, the second optical member 72, and the rotation mechanism are provided, in place of a phase shifter and a deflector, but there is no need to provide an optical member (half mirror) for separating the light and an optical member (half mirror) for interfering the separated light. Therefore, it is possible to reduce the number of components and suppress the increased in the size of the apparatus. Further, since there is no need to provide an optical member for separating and interfering the irradiation light, it is possible to suppress the loss amount of light due to reflection and transmission by the optical member.

The other effects of the fifth embodiment are the same as those of the fourth embodiment.

Modified Embodiments

It should be understood that the embodiments disclosed here are examples in all respects and are not restrictive. The scope of the present invention is indicated by the appended claims rather than by the description of the above-described embodiments and includes all modifications (changes) within the meanings and the scopes equivalent to the scope of the claims.

For example, although in the above-described embodiment, an example in which the interference image imaging apparatus of the present invention is used for the defect inspection, the present invention is not limited to this example. For example, the interference image imaging apparatus of the present invention may be used in other applications.

In addition, in the above-described embodiments, an example is shown in which the interference image imaging apparatus is used for a defect inspection in which acoustic wave is given to an object to inspect the defect, but the present invention is not limited thereto. For example, no sound wave may be applied, and heat or the like other than sound wave may be applied to an object.

In the above-described embodiments, the first portion is arranged on the outer side and the second portion is arranged on the inner side, but the present invention is not limited thereto. In the present invention, the first portion may be arranged on the inner side.

In addition, in the above-described embodiments, an example is described in which the composite lens pair in which the first portion and the second portion are integrated is included, but the present invention is not limited thereto. For example, it may not be a lens as long as it transmits the irradiation light and performs the deflection and the phase shift.

In the above-described embodiments, an example is shown in which the optical member has a first portion formed in an annular shape as viewed in the incident direction of the irradiation light so as to surround a circular second portion, but the present invention is not limited to this example. For example, the first portion and the second portion may be formed in a polygonal shape when viewed in the incident direction of the irradiation light.

Figure 21:
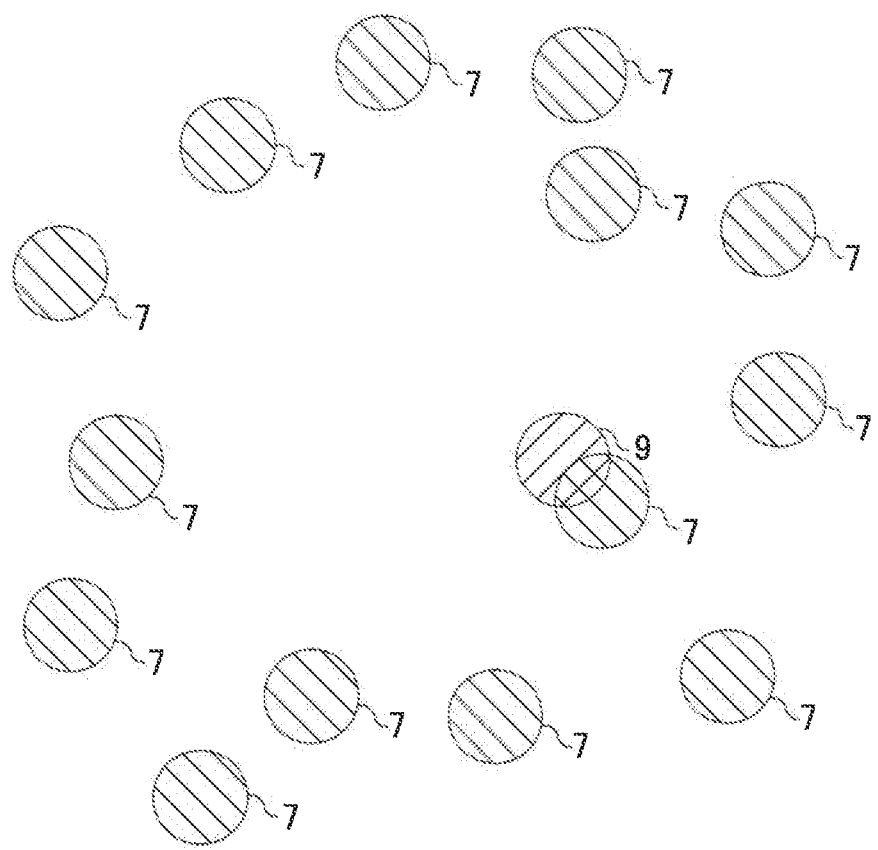
FIG. 21 is a diagram showing an example of the shape of the first bundle of rays and the second bundle of rays incident on the imaging element according to a modification.

In the present invention, for example, the first portion of the optical member may be partially configured by a diffuser, such as, e.g., a ground glass and a holographic diffuser. In this case, as shown in FIG. 21, in the imaging element, the first bundle of rays scatters and is incident on the several portions around the second bundle of rays.

In the above-described embodiments, an example is shown in which the reflected light from the object is separated into the first bundle of rays and the second bundle of rays, but the present invention is not limited thereto. For example, rather than the light reflected from the object, the transmitted light from the object may be separated into the first bundle of rays and the second bundle of rays.

In the above-described embodiments, an example is shown in which the interference image imaging apparatus is used for a displacement measurement device, but the present invention is not limited thereto. For example, the interference image imaging apparatus may be used for microscopy and the like.

In addition, in the above-described embodiments, an example is shown in which the first portion is configured by the first optical member, but the present invention is not limited thereto. For example, the first portion may be configured by the second optical member. In this case, the second optical member is integrated with the first portion and the second portion.

In the above-described embodiments, an example is shown in which the first portion and the second portion of the surface of the first optical member are inclined at the same angles, but the present invention is not limited thereto. For example, it may be inclined at different angles.

Further, in the above-described embodiments, an example is shown in which the first portion is formed in one inclined surface or a cone shape, but the present invention is not limited thereto. For example, two inclined or a curved surface may be used for the first portion to deflect the first bundle of rays.

In the above-described embodiments, an example is shown in which the first optical member and the second optical member are formed in a convex shape in which the thickness of the second portion is larger than that of the first portion, but the present invention is not limited thereto. For example, they may be formed in a concave shape in which the thickness of the second portion is smaller than that of the first portion.

Further, in the above-described embodiments, an example is shown in which the imaging lens is arranged after the optical member, but the present invention is not limited thereto. For example, it may be placed in front of the optical member. Further, the imaging lens may be composed of a plurality of lenses or a plurality of lens groups. For example, the imaging lens may be configured by a first lens group and a second lens group, with the first lens group arranged in front of the optical member and a second lens in rear of the optical member. In this case, when the first lens group is a concave lens system, the angles of the light incident on the limiting aperture can be made close in parallel, which is preferable.

In the fourth embodiment and the fifth embodiment, the second optical member, the first optical member, and the third optical member are arranged in this order in the incident direction of the irradiation light, but the present invention is not limited thereto. For example, the third optical member, the first optical member, and the second optical member may be arranged in this order in the incident direction of the irradiation light.

In the fourth embodiment and the fifth embodiment, an example is shown in which the displacement measurement device (interference image imaging apparatus) is changed in the phase by the second optical member, but the present invention is not limited thereto. For example, the phase may be changed by the third optical member.

In the fifth embodiment, an example is shown in which the second bundle of rays is deflected, but the present invention is not limited thereto. For example, it may be configured such that the second bundle of rays is not deflected and the first bundle of rays is deflected. In this instance, the outer side portion of the third optical member facing the first optical member is inclined with respect to the outer side portion of the first optical member facing the third optical member, and the opposing inner side portions of the first optical member and the third optical member are parallel to each other.

DESCRIPTION OF SYMBOLS

1: Irradiation unit
2: Optical member
3: Imaging element (imaging unit)
6: Object
7: First bundle of rays
8: First portion
9: Second bundle of rays
10: Second portion
11: Actuator
12: Light shielding member
13: Limiting aperture
14: Imaging lens
21, 31, 41, 51, 71: First optical member
22, 52, 72: Second optical member
100: Displacement measurement device (interference image imaging apparatus)

The invention claimed is:

1. An interference image imaging apparatus comprising:
an irradiation unit configured to emit irradiation light from a laser light source to a measurement region of an object;
an optical member configured to transmit the irradiation light reflected from or transmitted through mutually different points or regions of the object in a state of being separated into a first bundle of rays and a second bundle of rays and interfere the transmitted first bundle of rays and the transmitted second bundle of rays with each other;
an imaging unit configured to image an intensity pattern of the first bundle of rays and the second bundle of rays, the first bundle of rays and the second bundle of rays being transmitted through the optical member and interfered with each other; and
a rotation mechanism configured to rotate at least a portion of the optical member, wherein the optical member includes a first optical member, a second optical member arranged to face the first optical member, and a third optical member arranged to face the first optical member on a side opposite to a side where the second optical member is provided, wherein the rotation mechanism is configured to change a relative angle between the first bundle of rays and the second bundle of rays by rotating at least one of the first optical member and the third optical member, and wherein the first optical member and the second optical member are configured to transmit the second bundle of rays to change a phase of the second bundle of rays.

2. An interference image imaging apparatus comprising:

an irradiation unit configured to emit irradiation light from a laser light source to a measurement region of an object;

an optical member configured to transmit the irradiation light reflected from or transmitted through mutually different points or regions of the object in a state of being separated into a first bundle of rays and a second bundle of rays and interfere the transmitted first bundle of rays and the transmitted second bundle of rays with each other; and an imaging unit configured to image an intensity pattern of the first bundle of rays and the second bundle of rays, the first bundle of rays and the second bundle of rays being transmitted through the optical member and interfered with each other;

wherein the optical member includes a first optical member and a second optical member, the first optical member and the second optical member being arranged to face each other, and wherein the optical member includes a first portion and a second portion, the first portion being configured by at least one of the first optical member and the second optical member and configured to transmit the first bundle of rays to change a direction of outgoing light with respect to a direction of incident light, and the second portion being configured by the first optical member and the second optical member and configured to transmit the second bundle of rays to change a phase of the second bundle of rays with respect to the first bundle of rays.

3. The interference image imaging apparatus as recited in claim 2, wherein at least one of the first optical member and the second optical member includes a compound lens pair in which the first portion and the second portion are integrated.

4. The interference image imaging apparatus as recited in claim 2, wherein the first optical member and the second optical member each are provided with the first portion on an outer side and the second portion on an inner side.

5. The interference image imaging apparatus as recited in claim 2, wherein the optical member is provided with a light shielding member at a boundary portion where the first portion and the second portion are adjacent to each other.

6. The interference image imaging apparatus as recited in claim 2, wherein the optical member is arranged close to a position of a limiting aperture of an optical system for causing the irradiation light reflected from the object to be incident on the imaging unit.

7. The interference image imaging apparatus as recited in claim 2, wherein the optical member is configured such that the first portion formed in an annular shape when viewed in an incident direction of the irradiation light is arranged adjacently so as to surround the second portion formed in a circular shape.

8. The interference image imaging apparatus as recited in claim 2, wherein a surface of the first portion of the first optical member facing the second optical member and opposing surfaces of the second portion of the first optical member and the second portion of the second optical member are provided so as to be inclined with respect to a direction perpendicular to an incident direction of the irradiation light, and wherein the opposing surfaces of the second portion of the first optical member and the second portion of the second optical member are provided approximately in parallel to each other.

9. The interference image imaging apparatus as recited in claim 2, wherein the first optical member is configured such that the second portion is formed in a circular shape when viewed in an incident direction of the irradiation light and the first portion is formed in a cone shape from which a head portion is removed, and a tip end of the first portion being in contact with the the second portion.

10. The interference image imaging apparatus as recited in claim 2, wherein the first optical member is configured such that the first portion is formed in a polygonal pyramid from which a head portion is removed as viewed in an incident direction of the irradiation light.

11. The interference image imaging apparatus as recited in claim 2, wherein the optical member includes a third optical member arranged to face the first optical member, wherein a surface of the second portion of the first optical member facing the second optical member and a surface of the second portion of the second optical member facing the first optical member are inclined in a first direction perpendicular to an incident direction of the irradiation light, wherein a surface of the second portion of the first optical member facing the third optical member and a surface of the second portion of the third optical member facing the first optical member are inclined in a second direction perpendicular to the incident direction of the irradiation light and intersecting with the incident direction of the irradiation light, and wherein the optical member further includes a rotation mechanism for changing a relative angle between the first direction and the second direction by rotating the third optical member.

12. The interference image imaging apparatus as recited in claim 11, wherein the rotation mechanism includes a first rotation mechanism for integrally rotating the first optical member and the third optical member with respect to the second optical member.

13. The interference image imaging apparatus as as recited in claim 12, wherein the rotation mechanism includes, in addition to the first rotation mechanism, a second rotation mechanism for rotating the third optical member with respect to the first optical member.

14. The interference image imaging apparatus as recited in claim 11,
wherein the second optical member, the first optical member, and the third optical member are arranged in this order in the incident direction of the irradiation light.

* * * * *